(12) United States Patent
Nerayoff et al.

(10) Patent No.: US 9,652,666 B2
(45) Date of Patent: May 16, 2017

(54) HUMAN REVIEW OF AN IMAGE STREAM FOR A PARKING CAMERA SYSTEM

(71) Applicant: CLOUDPARC, INC., Great Neck, NY (US)

(72) Inventors: Steven David Nerayoff, Great Neck, NY (US); Thompson S. Wong, West Vancouver (CA)

(73) Assignee: CLOUDPARC, INC., Great Neck, NY (US)

( * ) Notice: Subject to any disclaimer, the term of this patent is extended or adjusted under 35 U.S.C. 154(b) by 0 days.

(21) Appl. No.: 14/263,916

(22) Filed: Apr. 28, 2014

(65) Prior Publication Data

US 2014/0236786 A1    Aug. 21, 2014

Related U.S. Application Data

(63) Continuation of application No. 14/187,300, filed on Feb. 23, 2014, now Pat. No. 8,982,213, which is a
(Continued)

(51) Int. Cl.
*H04N 7/18* (2006.01)
*G06K 9/00* (2006.01)
(Continued)

(52) U.S. Cl.
CPC .......... *G06K 9/00342* (2013.01); *G06K 9/00* (2013.01); *G06K 9/0063* (2013.01);
(Continued)

(58) Field of Classification Search
None
See application file for complete search history.

(56) References Cited

U.S. PATENT DOCUMENTS 5,173,692 A    12/1992   Shapiro et al.
5,351,187 A     9/1994   Hassett
(Continued)

FOREIGN PATENT DOCUMENTS

CN    102243813 A       11/2011
EP      1895486 A1       3/2008
(Continued)

OTHER PUBLICATIONS

Ellis, "Multi-camera video surveillance" Security Technology, Proceedings 36th Annual 2002 International Carnahan Conference, pp. 228-233, IEEE, 2002.

*Primary Examiner* — James M Anderson, II
(74) *Attorney, Agent, or Firm* — Baker & Hostetler LLP

(57) ABSTRACT

Providing human review of an image stream for a parking camera system is disclosed. Initially, a first image stream is received from a first camera having a first field of view showing a first vehicle or at least one destination location. Next, it is determined that a value for the at least one type of information relating to the at least one destination location or the first vehicle has failed to be automatically detected. In response, an exemption event is generated. Presentation of the at least part of the first image stream to a human operator is then enabled. Finally, the value for the at least one type of information relating to the at least one destination location or the first vehicle is received from the human operator.

27 Claims, 6 Drawing Sheets

Related U.S. Application Data continuation of application No. 13/686,802, filed on Nov. 27, 2012, now Pat. No. 8,698,895.

(60) Provisional application No. 61/680,268, filed on Aug. 6, 2012.

(51) Int. Cl.

| | | |
|---|---|---|
| *G08G 1/133* | (2006.01) | |
| *G06K 9/32* | (2006.01) | |
| *G06K 9/18* | (2006.01) | |
| *G06K 9/62* | (2006.01) | |
| *G06Q 50/30* | (2012.01) | |
| *G08G 1/00* | (2006.01) | |
| *G07B 15/02* | (2011.01) | |
| *G06Q 20/14* | (2012.01) | |
| *G06Q 30/04* | (2012.01) | |
| *G08G 1/14* | (2006.01) | |
| *G07B 15/00* | (2011.01) | |
| *G06Q 30/02* | (2012.01) | |
| *G08G 1/017* | (2006.01) | |
| *H04N 5/232* | (2006.01) | |
| *G06Q 20/02* | (2012.01) | |
| *G08G 1/052* | (2006.01) | |
| *G08G 1/056* | (2006.01) | |
| *G06Q 50/26* | (2012.01) | |
| *G06T 7/20* | (2017.01) | |
| *G07F 17/24* | (2006.01) | |
| *H04N 5/247* | (2006.01) | |
| *G06T 7/70* | (2017.01) | |
| *G06T 7/73* | (2017.01) | |
| *G06T 7/292* | (2017.01) | |

(52) U.S. Cl.
CPC ..... *G06K 9/00624* (2013.01); *G06K 9/00771* (2013.01); *G06K 9/00785* (2013.01); *G06K 9/00791* (2013.01); *G06K 9/00838* (2013.01); *G06K 9/18* (2013.01); *G06K 9/325* (2013.01); *G06K 9/6201* (2013.01); *G06Q 20/02* (2013.01); *G06Q 20/145* (2013.01); *G06Q 30/0284* (2013.01); *G06Q 30/04* (2013.01); *G06Q 50/265* (2013.01); *G06Q 50/30* (2013.01); *G06T 7/20* (2013.01); *G06T 7/292* (2017.01); *G06T 7/70* (2017.01); *G06T 7/73* (2017.01); *G07B 15/00* (2013.01); *G07B 15/02* (2013.01); *G07F 17/24* (2013.01); *G08G 1/00* (2013.01); *G08G 1/017* (2013.01); *G08G 1/0175* (2013.01); *G08G 1/052* (2013.01); *G08G 1/056* (2013.01); *G08G 1/133* (2013.01); *G08G 1/14* (2013.01); *G08G 1/142* (2013.01); *G08G 1/143* (2013.01); *G08G 1/144* (2013.01); *G08G 1/146* (2013.01); *G08G 1/148* (2013.01); *H04N 5/23203* (2013.01); *H04N 5/23216* (2013.01); *H04N 5/247* (2013.01); *H04N 7/181* (2013.01); *G06K 2209/15* (2013.01); *G06T 2207/10004* (2013.01); *G06T 2207/30236* (2013.01); *G06T 2207/30264* (2013.01); *H04N 5/23229* (2013.01); *H04N 5/23296* (2013.01); *H04N 7/18* (2013.01)

(56) References Cited

U.S. PATENT DOCUMENTS

| | | |
|---|---|---|
| 5,757,286 A | 5/1998 | Jonsson et al. |
| 5,948,038 A * | 9/1999 | Daly et al. ............ 701/117 |
| 6,437,919 B1 | 8/2002 | Brown et al. |
| 6,747,687 B1 | 6/2004 | Alves |
| 7,016,518 B2 | 3/2006 | Vernon |
| 7,104,447 B1 | 9/2006 | Lopez et al. |
| 7,116,246 B2 | 10/2006 | Winter et al. |
| 7,123,166 B1 | 10/2006 | Haynes et al. |
| 7,339,495 B2 | 3/2008 | Kavner |
| 7,466,223 B2 | 12/2008 | Sefton |
| 7,791,501 B2 | 9/2010 | Ioli |
| 7,821,423 B2 | 10/2010 | Lee |
| 7,893,848 B2 | 2/2011 | Chew |
| 7,950,570 B2 | 5/2011 | Marchasin et al. |
| 8,139,115 B2 | 3/2012 | Barnes et al. |
| 8,196,835 B2 | 6/2012 | Emanuel et al. |
| 8,254,633 B1 | 8/2012 | Moon et al. |
| 8,626,418 B2 | 1/2014 | Boulet et al. |
| 8,660,890 B2 | 2/2014 | Hedley |
| 8,698,895 B2 | 4/2014 | Nerayoff et al. |
| 8,982,213 B2 | 3/2015 | Nerayoff et al. |
| 9,087,415 B1 | 7/2015 | McLain et al. |
| 2002/0008639 A1 | 1/2002 | Dee |
| 2002/0109609 A1 | 8/2002 | Potter et al. |
| 2004/0054513 A1 | 3/2004 | Laird et al. |
| 2004/0161133 A1 | 8/2004 | Elazar et al. |
| 2004/0233036 A1 | 11/2004 | Sefton |
| 2004/0240542 A1 | 12/2004 | Yeredor et al. |
| 2005/0002544 A1 | 1/2005 | Winter et al. |
| 2005/0111699 A1 * | 5/2005 | Gran ............................ 382/104 |
| 2005/0116838 A1 | 6/2005 | Bachelder et al. |
| 2005/0270178 A1 | 12/2005 | Ioli |
| 2006/0016966 A1 | 1/2006 | Hughes et al. |
| 2006/0187305 A1 | 8/2006 | Trivedi et al. |
| 2006/0250277 A1 | 11/2006 | Colak |
| 2006/0274917 A1 | 12/2006 | Ng et al. |
| 2007/0029825 A1 | 2/2007 | Franklin et al. |
| 2007/0069921 A1 | 3/2007 | Sefton |
| 2007/0250260 A1 | 10/2007 | Ariyur et al. |
| 2007/0294692 A1 * | 12/2007 | Zhao .................... G06F 9/4875 718/102 |
| 2008/0063239 A1 | 3/2008 | Macneille et al. |
| 2008/0101656 A1 | 5/2008 | Barnes et al. |
| 2008/0231470 A1 | 9/2008 | Ioli |
| 2008/0308631 A1 | 12/2008 | Mitschele et al. |
| 2009/0046897 A1 | 2/2009 | Rowsell et al. |
| 2009/0132100 A1 | 5/2009 | Shibata |
| 2009/0174777 A1 | 7/2009 | Smith |
| 2009/0254248 A1 | 10/2009 | Park et al. |
| 2009/0288011 A1 * | 11/2009 | Piran et al. .................... 715/720 |
| 2009/0294573 A1 | 12/2009 | Wilson et al. |
| 2009/0309760 A1 * | 12/2009 | Chew ........................ 340/932.2 |
| 2010/0026522 A1 | 2/2010 | Ward |
| 2010/0030628 A1 | 2/2010 | Renshaw-Smith et al. |
| 2010/0057338 A1 | 3/2010 | Febonio et al. |
| 2010/0060485 A1 | 3/2010 | Kim |
| 2010/0117863 A1 | 5/2010 | Dutt |
| 2010/0157049 A1 | 6/2010 | Dvir et al. |
| 2010/0157064 A1 | 6/2010 | Cheng et al. |
| 2010/0191584 A1 | 7/2010 | Fraser et al. |
| 2010/0201815 A1 | 8/2010 | Anderson et al. |
| 2010/0245125 A1 | 9/2010 | Wike, Jr. et al. |
| 2010/0265104 A1 | 10/2010 | Zlojutro |
| 2010/0271497 A1 | 10/2010 | Monsive, Jr. |
| 2011/0010025 A1 | 1/2011 | Eu et al. |
| 2011/0057815 A1 | 3/2011 | King et al. |
| 2011/0060653 A1 | 3/2011 | King et al. |
| 2011/0099126 A1 * | 4/2011 | Belani et al. ................. 705/418 |
| 2011/0148662 A1 | 6/2011 | Lowenthal |
| 2011/0218940 A1 | 9/2011 | Bergstrom et al. |
| 2011/0233274 A1 | 9/2011 | Flanagan et al. |
| 2011/0267469 A1 | 11/2011 | Mom et al. |
| 2012/0007983 A1 | 1/2012 | Welch |
| 2012/0056758 A1 | 3/2012 | Kuhlman et al. |
| 2012/0062395 A1 * | 3/2012 | Sonnabend et al. ........ 340/932.2 |
| 2012/0092191 A1 | 4/2012 | Stefik et al. |
| 2012/0092192 A1 | 4/2012 | Wong |
| 2012/0092503 A1 | 4/2012 | Cheng |
| 2012/0130872 A1 | 5/2012 | Baughman et al. |
| 2012/0143657 A1 | 6/2012 | Silberberg |
| 2012/0162416 A1 | 6/2012 | Su et al. |

(56) References Cited

U.S. PATENT DOCUMENTS

| | | |
|---|---|---|
| 2012/0162431 A1 | 6/2012 | Riesebosch |
| 2012/0166240 A1 | 6/2012 | Jones et al. |
| 2012/0215596 A1 | 8/2012 | Johnson et al. |
| 2012/0274482 A1 | 11/2012 | Chen et al. |
| 2012/0280836 A1 | 11/2012 | Roesner |
| 2012/0287278 A1* | 11/2012 | Danis .......................... 348/148 |
| 2013/0100286 A1 | 4/2013 | Lao |
| 2013/0120160 A1 | 5/2013 | Ren |
| 2013/0265419 A1 | 10/2013 | Bulan et al. |
| 2013/0265423 A1 | 10/2013 | Bernal et al. |
| 2013/0265426 A1 | 10/2013 | Fan et al. |
| 2013/0266185 A1 | 10/2013 | Bulan et al. |
| 2013/0266187 A1 | 10/2013 | Bulan et al. |
| 2013/0266188 A1 | 10/2013 | Bulan et al. |
| 2013/0266190 A1 | 10/2013 | Wang et al. |
| 2013/0335611 A1 | 12/2013 | Roman et al. |
| 2014/0009612 A1* | 1/2014 | King .................... B66F 9/0755 348/143 |
| 2014/0020635 A1 | 1/2014 | Sayers et al. |
| 2014/0213176 A1 | 7/2014 | Mendelson |
| 2015/0339924 A1 | 11/2015 | Cook et al. |

FOREIGN PATENT DOCUMENTS

| | | |
|---|---|---|
| JP | 2011070304 A | 4/2011 |
| WO | WO2005022485 A1 | 3/2005 |
| WO | WO2011024161 A1 | 3/2011 |
| WO | WO2011037109 A1 | 3/2011 |
| WO | WO2011114799 A1 | 9/2011 |
| WO | WO2012059705 A1 | 5/2012 |

* cited by examiner

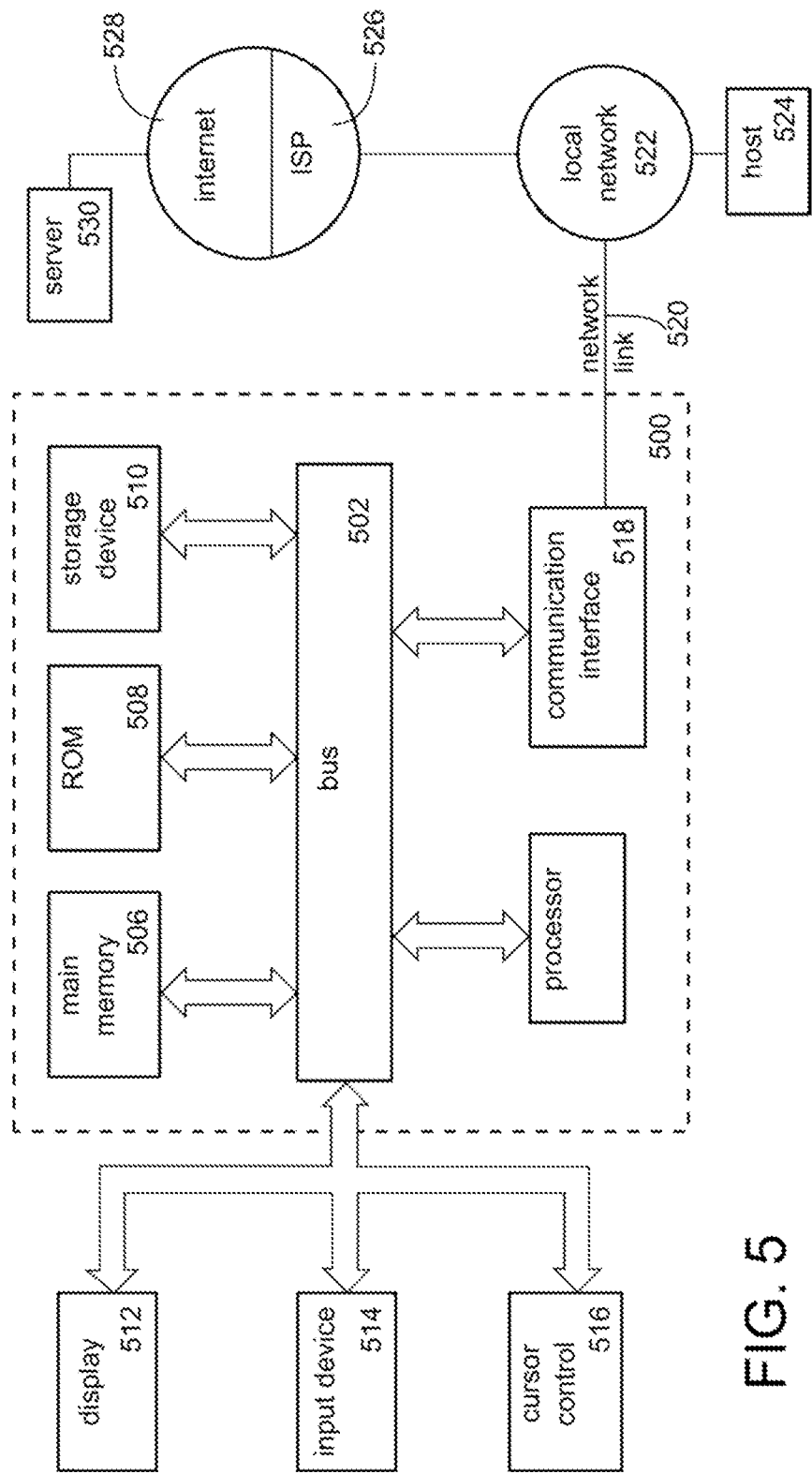

HUMAN REVIEW OF AN IMAGE STREAM FOR A PARKING CAMERA SYSTEM

CROSS-REFERENCE TO RELATED APPLICATIONS

This application is a continuation of U.S. patent application Ser. No. 14/187,300, filed Feb. 23, 2014, which is a continuation of U.S. patent application Ser. No. 13/686,802, filed Nov. 27, 2012, and now U.S. Pat. No. 8,698,895, which claims the benefit of U.S. Provisional Patent Application No. 61/680,268, filed on Aug. 6, 2012, the disclosures of which are incorporated by reference in their entirety.

FIELD OF THE INVENTION

This invention relates to the use of cameras to identify vehicles and track and control the use of parking spaces by the vehicles.

BACKGROUND

Various municipal and private parking operators have extensive legacy parking management systems for managing the use of, and obtaining revenue for the user of, destination locations for vehicles, such as parking spaces for wheeled motor vehicles. The substantial rework and expense that traditionally has been required to upgrade such legacy systems to full automation poses a substantial up-front capital investment that prevents many parking operators from performing such upgrades.

What is needed is a fully automated and autonomous parking management system which easily integrates with existing parking payment systems, including systems that have already been installed and operational for some time. Doing so unlocks new revenue opportunities and efficiencies for the parking facility operators that are previously untapped.

SUMMARY

In an embodiment, there is a method of tracking the use of at least one destination location, the method comprising: receiving a plurality of vehicle images captured by a plurality of cameras, wherein each vehicle image includes an image of a first vehicle, the plurality of cameras includes a first identification camera, the plurality of cameras includes a destination camera, the vehicle images include one or more first identification images captured by the first identification camera, a plurality of destination images captured by the destination camera including a first destination image captured at a first time, a second destination image captured at a second time after the first time, and a third destination image captured at a third time after the second time; determining a first unique identifier for the first vehicle based on the first identification images; determining a first plurality of characteristics for the first vehicle based on the first identification images; determining a second plurality of characteristics for a vehicle based on one or more of the destination images; determining that the second plurality of characteristics correspond to the first plurality of characteristics; determining that an image of the first vehicle is included in the plurality of destination images based on the determining that the second plurality of characteristics correspond to the first plurality of characteristics; determining the first vehicle is stopped at a first destination location based on the first destination image and the second destination image; determining the first vehicle has left the first destination location based on the third destination image; indicating that the first vehicle began use of the first destination location at the first time; and indicating that the first vehicle completed use of the first destination location at the third time, wherein the preceding steps of receiving, determining, and indicating are performed by one or more computers collectively programmed to perform the preceding steps.

Various benefits obtained by the disclosed subject matter include, but are not limited to: (1) offering hands-off self-enforcement for parking citations; (2) offering hands-off self-enforcement for parking citations that integrates with existing "in-place" parking payment infrastructure; (3) a smaller number of sensors, and associated reduction in installation costs, in comparison to techniques relying on proximity sensors that identify the presence of only one or very few vehicles—a factor which can prove significant for the management of parking spaces in large open areas, such as parking lots; (4) leveraging commercial off-the-shelf (COTS) technologies, and associated reduction in equipment costs, for vehicle detection and parking enforcement; (5) improvements in software-based vehicle detection techniques can be quickly updated throughout the system, particularly in an embodiment where image processing is performed remote from the cameras, and realizing improvements in vehicle detection without hardware changes throughout a parking management system; (6) the ability to rapidly make changes in system behavior system-wide, or in connection with a more narrowly defined subset of parking spaces.

BRIEF DESCRIPTION OF THE DRAWINGS

FIG. 5 is a block diagram that illustrates a computer system 500 upon which aspects of the invention may be implemented, FIG. 6A illustrates a portion of the GUI in which an image from a first camera is displayed. FIG. 6B illustrates a portion of the GUI in which an image from a second camera is displayed.

DETAILED DESCRIPTION

Figure 1:
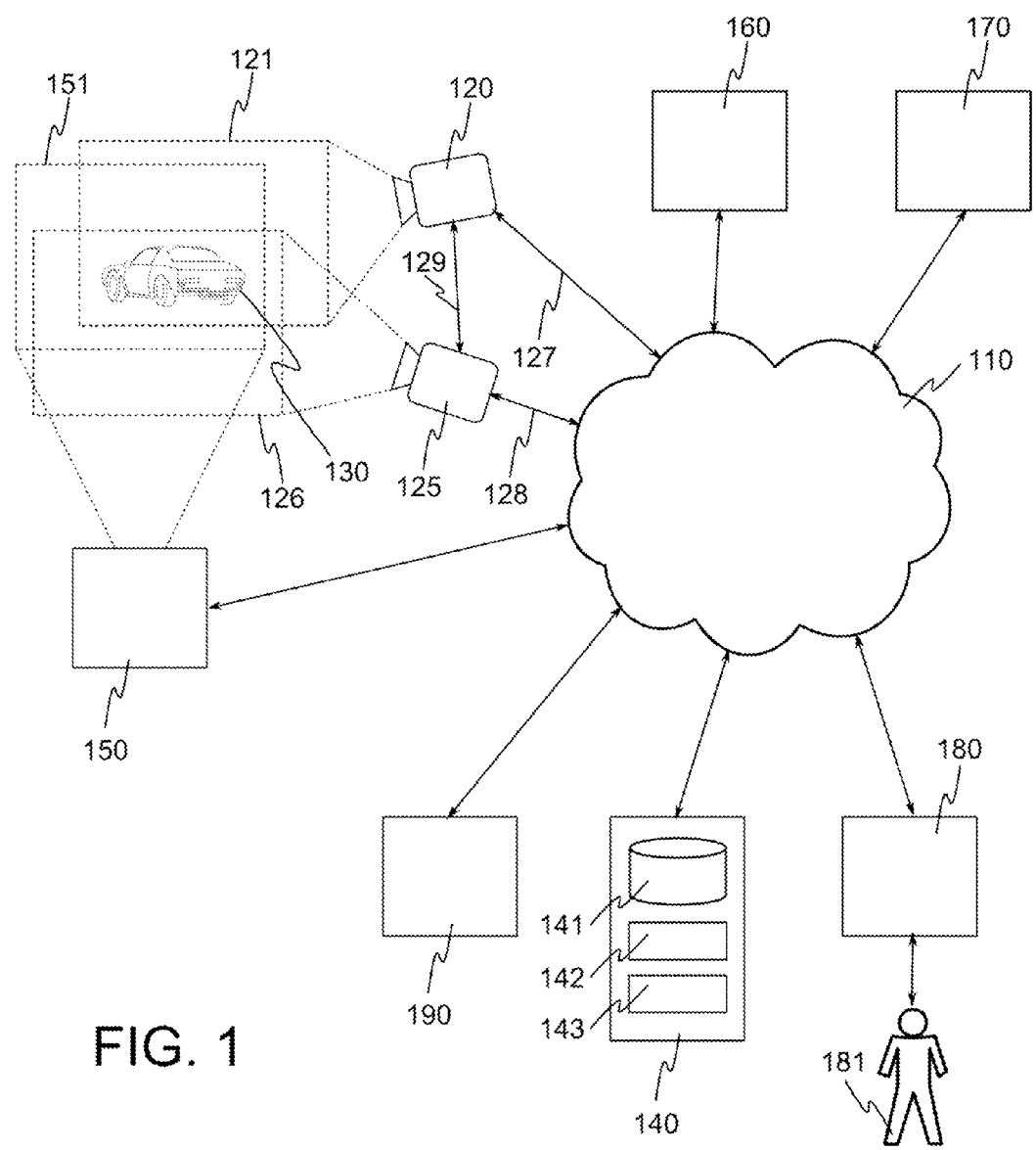
FIG. 1 illustrates an example of an overall system 100 according to the disclosed subject matter.

FIG. 1 illustrates an example of an overall system 100 according to the disclosed subject matter. Network 110 provides data communication services among the elements illustrated in FIG. 1. There are many networking technologies, including, but not limited to, Ethernet, 802.11 wireless, and cellular data networking technologies, which those skilled in the art can reliably and predictably integrate for the exchange of data among the illustrated elements. In an embodiment, separate networks may be used. For example, cameras 120 and 125 and server 140 may communicate via a first network, whereas the other elements communicate via the public Internet. By use of an independent first network, those skilled in the art may realize desired goals for reliability and security.

Identification camera 120 illustrates one of a plurality of such cameras included in system 100. For the convenience of discussion, only a single Identification camera 120 is illustrated in FIG. 1. Identification camera 120 is positioned such that it may capture images of vehicle identifiers, such as, but not limited to, an automobile license plate or a label affixed to a vehicle that provides a vehicle identifier in a format such as, but not limited to, a QR code or a bar code. Images captured by Identification camera 120, such as image 121, are used in conjunction with images captured by one or more destination cameras 125 in order to identify individual vehicles, such as vehicle 130, and record their usage of various destination locations. Examples of destination locations for wheeled motor vehicles include areas designated as appropriate for parking, although possibly subject to various restrictions, such as, but not limited to, parking spots, and areas designated as inappropriate for parking, such as, but not limited to, bus stops, fire lanes, areas around fire hydrants, sidewalks, areas within X feet of an intersection, driveways, islands, medians, bicycle lanes, pedestrian crossings. For example, server system 140 may be configured to determine when a vehicle is parked at a bus stop, and request or take action upon that determination, such as requesting the vehicle be towed or issue a citation by mail. In an embodiment, other parking violations may be identified, such as a vehicle not being properly parked within a designated parking space, parking more than 1 foot from a curb, parking with the left wheels toward the curb (parked facing wrong direction), back-in angle parking, and abandoned vehicles (left in a particular location for X or more consecutive days). In an embodiment, an Identification camera may also include a mobile or handheld camera, including, for example, a camera included in a smartphone.

Destination camera 125 illustrates one of a plurality of such cameras included in system 100. For the convenience of discussion, only a single destination camera 125 is illustrated in FIG. 1. Destination camera 125 is positioned such that it may capture images of one or more destination locations, such as, but not limited to, automobile parking spots. Typically, destination camera 125 will be mounted at an elevation, such as, but not limited to, on a lighting or telephone pole, or on the façade or top of a building. By mounting destination camera 125 at an elevation, the field of view of images, such as image 126, captured by destination camera 125 can include, and therefore be used to monitor, multiple destination locations. In an embodiment, a destination camera may also include a mobile or handheld camera, including, for example, a camera included in a smartphone. In an embodiment, a destination camera may be included in a parking meter body. In an embodiment, a destination camera may be provided by a space satellite imaging camera, potentially obviating a need for destination cameras installed throughout a municipality. In an embodiment, a destination camera may be included in an air vehicle, such as, but not limited to, a blimp or other airship, or an unmanned air vehicle, and may be autonomously operated for extended periods of flight.

Although Identification camera 120 and destination camera 125 may be configured to each directly communicate with network 110 via respective communication links 127 and 128. In another embodiment, Identification camera 120 may be configured to communicate directly with, and relay data through, destination camera 125, such that rather than Identification camera 120 being configured to communicate directly with network 110 via communication link 127, it communicates with destination camera 125 via communication link 129, and destination camera 125 communicates with network 110 via communication link 128, such that destination camera 125 serves to relay data to and from identification camera 120. Communication link 129 may be a wireless networking link. Although FIG. 1 illustrates an example with a communication link 129 between the two cameras 120 and 125, this may be extended to data being sent from or to a given camera by relaying the data through multiple cameras. Additionally, a wireless mesh network may be established among a plurality of cameras, providing a fault-tolerant and self-configuring wireless communication medium among the cameras. By using wireless communications instead of hardwired links, the number of hardwired communications links in the system as a whole, and expense and labor associated with installing and maintaining such hardwired links, can be reduced. Also, this may serve as a useful alternative to using, for example, cellular data communications for conveying data to network 110, as typically the cost of cellular data communications is significantly greater than via a hardwired link. However, wireless communication is not required, and some or all cameras may communicate via a hardwired link.

Server system 140 comprises one or more computer systems which provide central data storage, data retrieval, and processing services. The computer systems included in server system 140 will generally each include a random access memory 142 and a processor 143. Server system 140 includes database 141, which is used to record information such as usage of destination locations, such as parking spaces, by vehicles; vehicle account information; identifications of vehicles obtained via identification camera images; observations of vehicles obtained via destination camera images; destination reservation information; billing information; and payment information. Database 141 may be implemented, for example, using software programs such as MySQL, Oracle, or DBASE. Database 141 may comprise multiple database instances executing across multiple computer systems.

In an embodiment, server system 140 is configured to perform vehicle and vehicle identification recognition from images captured by identification cameras, such as identification camera 120, and destination cameras, such as destination camera 125. Further server 140 is configured to perform decision making based on the recognized information, such as determining the usage of destination locations, and when the usage of a destination location is in violation of use restrictions for the destination location. This embodiment, in which image processing and decision making are centralized in server system 140, exploits Moore's Law, in which the number of transistors in a microprocessor, and a corresponding amount of data processing capability, doubles every 18 months, and Nielsen's Law, which hypothesizes that bandwidth speeds grow by 50% per year. Significant benefits can be realized by this centralized approach. Not only can the intelligence/feature-richness of server applications be quickly scaled up with ever cheaper and faster CPU power, new features and applications can also be quickly rolled out to onsite "thin-client" devices. Manufacturing costs are generally reduced by use of COTS (commercial off the shelf) components throughout the system. In addition, a highly networked system will be well positioned to take advantage of updates in technology services available via network. Finally, as microprocessor and bandwidth costs continue to decrease, the costs of expansion in size or capability can be realized at ever reducing costs.

In another embodiment, some functions may be distributed to other components of the system. For example, identification camera 120 may be configured to identify the presence of vehicle identification information, such as license plate numbers, in captured images. In such an embodiment, the amount of data communication bandwidth between identification camera 120 and server system 140, and the amount of processing which must be performed by server system 140 may be significantly reduced, with a tradeoff in that identification camera 120 needs to be a more sophisticated device capable of performing image processing functions capable of, for example, identifying the presence of vehicles in images, identifying the presence of vehicle identification information in images, and/or extracting vehicle identification information from images. By way of another example, the identification and destination cameras can be programmed to determine characteristics of vehicle images, as detailed below in connection with FIG. 4, rather than perform such determinations using server system 140. How functions may be distributed throughout the system as a whole would depend on the anticipated costs of providing distributed functionality (such as providing the necessary processing hardware and programming to identification and/or destination cameras), weighed against the anticipated costs to convey images captured by the cameras to a central location for processing. Moving programmed functions from one computer system to another to accommodate communication bottlenecks, such as from server system 140 to identification camera 120, and ensuring that adequate processing resources are provided for various computer systems to perform these functions is a routine exercise which is well within the skill in the art.

Mobile device 150 comprises a programmable computer, an identification camera, and wireless data communication capability for communicating with server system 140. In an example, if vehicle 130 were determined to be using a destination location, but a unique identification for vehicle 130 had not been determined, mobile device 150 could be dispatched to the destination location, and an image 151 of vehicle 130 captured, from which a unique identification for vehicle 130 could be obtained. In additional to capturing an image of a license plate, as done by identification camera 120, mobile device 150 can also be configured to capture a vehicle VIN identifier tag, which may be helpful for vehicles lacking license plates. This helps overcome occasional situations, such as occlusion of vehicle 130 by another vehicle as it passes through the field of view for identification camera 120, in which identification camera 120 is unable to capture images effective for uniquely identifying vehicle 130. Multiple mobile devices may be included in the system in order to better ensure timely capture of images across all of the destination locations managed by server system 140. In an embodiment, mobile device 150 may also be configured to provide features useful for parking enforcement. For example, mobile device 150 may be configured to print out a paper citation for parking violations identified by server system 140.

Onsite payment system 160 is one of a plurality of devices which offers a direct physical interface, generally located near one or more destination locations, for an end user to submit a payment or an agreement to pay for the use of a destination location. Examples of payment system 160 include, but are not limited to, a parking meter dedicated to an individual destination location, a payment station associated with several street parking spaces, and a payment station for destination locations provided in a parking lot or garage. In an embodiment, onsite payment system 160 may include a destination camera which captures images for one or more destination locations.

End user system 170 is a programmable computer system by which an end user, such as a driver of vehicle 130, may interact with server system 140. Examples of such systems include, but are not limited to, a desktop computer system with a web browser application, a smartphone with a web browser application or dedicated parking application, and an in-vehicle system included in vehicle 130. End user system 170 may be used, for example, to create an end user account for repeated interactions with server system 140, reserve use of destination locations, request identification of an available destination location, and submit payment information for the use of a destination location.

In an embodiment, end user system 170 may be configured to request and obtain information from server system 140 describing available destination locations for a given area. In an example, end user system 170 may further be configured to obtain and/or request particular criteria for acceptable destination locations, such as destination locations which are in a parking garage or not on-street parking (such as a parking lot). In addition to location information, other information such as, but not limited to, cost of use for a given destination location may be obtained by end user system 170. End user system 170 may be further configured to request and obtain information for currently available destination locations and/or destination locations available at a specified point or range of time in the future. End user system may be further configured to provide a graphical user interface to the end user showing specific locations, such as on a map, of one or more of the available destination locations obtained from server system 140. In an embodiment, where multiple destination locations are available at a parking facility (such as a parking garage or parking lot), end user system 170 may be configured to broadly indicate the availability, possibly indicating a number of available destination locations) of a destination location at the parking facility, rather than individually identifying each destination location. End user system 170 may be configured to receive an indication of a selected destination location from the end user. End user system 170 may be further configured to provide guidance, such as turn-by-turn directions, to the selected destination location. End user system 170 may be further configured to instruct server system 140 to reserve use of an available destination location.

Manual review system 180 is a programmed computer system by which a human operator 181 provides assistance to server system 140 for identifying vehicles, such as vehicle 130. For example, server system 140 may determine that an error has occurred in performing an automated machine-based determination of a unique identifier for vehicle 130 from images, such as image 121, captured by identification camera 120. In response to this error, server system 140 may request assistance from human operator 181 to determine a unique identifier, such as a license plate number, for vehicle 130. Manual review system 180 provides a user interface by which human operator 181 may review image 121, and perhaps other images captured by identification camera 120 or other cameras. For example, human operator 181 can rewind the video footage manually and freeze-frame forward in order to manually determine the vehicle license plate number and state/province information. Via this interface, human operator 181 may provide an identification of vehicle 130 or indicate that human operator 181 was unable to determine an identification for vehicle 130, which may result in mobile device 150 being dispatched to a destination location in order to make a positive identification of vehicle 130. More than one manual review system 180 may be made available for use by server system 140, depending on the volume of information processed by server system 140. Additionally, human operator 181 may be a member of a Live Operator team, discussed in more detail below.

In an embodiment, one or more of the identification and destination cameras capture images at a higher frame rate and/or resolution than the images transmitted from the cameras to server system 140. Although not all of the image data captured by such cameras is transmitted to server system 140, in the interest in conserving possibly expensive network communication bandwidth (for example, a cellular data network) and limited image processing resources available at server system 410, such cameras can buffer a limited amount of the full image data that they capture, such as in a circular buffer. Additionally, such cameras are configured to respond to requests for such additional image data, including, for example, portions of higher resolution images which may be useful for license plate recognition. By this mechanism, server system 140 may automatically determine that additional images may be useful for identifying and tracking vehicles, or manual review system 180 may request various images in order to resolve an error raised by server system 140.

Parking operation system 190 is a programmed computer system by which a parking facility operator may interact with and control server system 140. Server system 140 is expected to operate autonomously with little input required by a parking operator the majority of the time. However, occasionally there are instances when the parking facility operator personnel take an active part in its operation. For example, parking operation system 190 may provide a live indication as to how many and which destination locations are being used and/or are available. As another example, parking operation system 190 may provide a live indication as to destination locations in which vehicles are violating usage restrictions, allowing parking facility operator personnel to take action for such violations as deemed necessary.

Figure 2A:
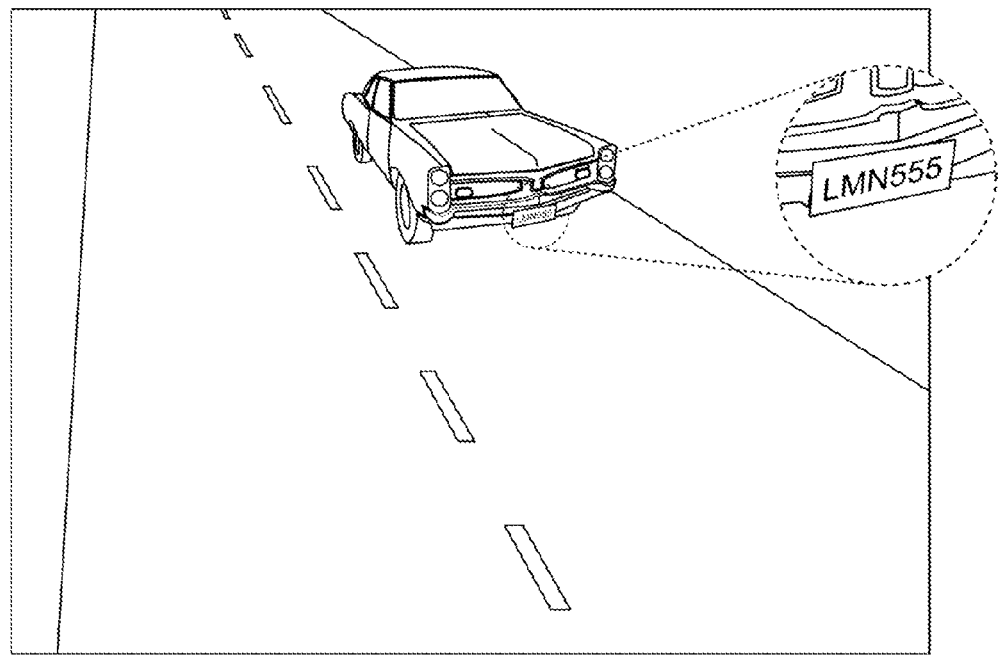
FIGS. 2A and 2B illustrate examples of images captured by identification cameras.

FIG. 2A illustrates an example of an image 121 captured by identification camera 120, where identification camera 120 is located so as to effectively capture identification information for vehicles passing by identification camera 120. In an embodiment, identification camera 120 streams video containing images of identification information, such as license plate information, to server system 140. Since typical streetlights are approximately 18 feet in height, they provide an excellent mounting location for identification cameras which benefit from a clear line of sight away from trees and other obstacles, including closely traveling vehicles. Also, as a streetlight is already supplied with power, the identification camera may be installed so as to draw power from the streetlight. In addition, as most city regulations require at least one streetlight per block on each site of the street, streetlight-mounted identification cameras can provide sufficient coverage for any vehicles traversing the street.

Identification images captured by identification camera 120 are used for two primary purposes: (1) obtaining a unique identification of a vehicle, such as by reading an identifier from a license plate mounted on the front or rear of the vehicle; and (2) determining various characteristics of the vehicle, so that it may be determined that an image of a vehicle obtained by another camera corresponds to an identified vehicle, as discussed below in connection with FIG. 4. In the example identification image shown in FIG. 2A, a view of a vehicle and its license are available for processing by server system 140. Multiple identification images may be used for determining vehicle characteristics such as speed and direction of travel.

In the field of license plate readers, various techniques are known in the art for reliably capturing images effective for reliable reading of vehicle identifiers under a variety of illumination and vehicle conditions. One nonlimiting example is described in U.S. Pat. No. 7,016,518, which is incorporated by reference in its entirety. In an embodiment, issues arising from the lack of natural illumination during night may be avoided where restrictions for the use of destination locations are only in effect during daylight hours.

In an embodiment, machine vision techniques for obtaining vehicle identifiers may be performed by identification camera 120. In such an embodiment, the amount of data sent from identification camera 120 to server system 140 may be significantly reduced, as a vehicle identifier can be sent in place of identification images. However, one or more identification images may still be transmitted to server system 140 for storage and/or determination of vehicle characteristics by server system 140 (although in an embodiment, this may also be performed by identification camera 120).

In an embodiment, server system 140 may recognize it is only able to obtain a portion of a vehicle identifier, perhaps as a result of certain particular conditions, such as the angle of the vehicle or a closely following vehicle. In such a case, server system may further rely on a second identification image captured by a second identification camera to obtain the remaining portion of the identifier.

Figure 2B:
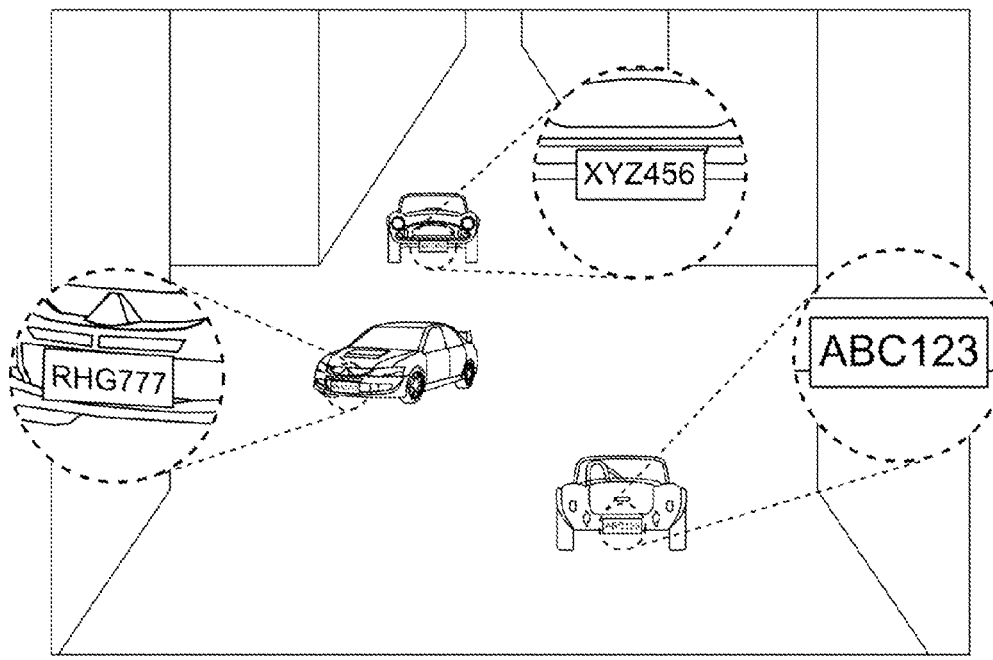

FIG. 2B illustrates an example of an image 121 captured by identification camera 120, where identification camera 120 is located so as to effectively capture identification information for vehicles entering and exiting an urban intersection via the roadway extending along the axis of view of identification camera 120. In this identification image, views of three vehicles are effective for processing by server system 140, such that unique identifiers may be obtained for all three vehicles from the single image.

In an embodiment, identification camera 120 may have pan, tilt, and/or zoom capability, which may be used for server system 140 to obtain a more detailed view of a vehicle, or may be used by parking facility operator personnel via a user interface on parking operation system 190 to monitor particular areas of interest viewable by identification camera 120. In such an embodiment, server system 140 may be configured to perform a coordinate transformation in order to accurately determine vehicle characteristics while varying the field of view of identification camera 120.

In an embodiment, when a vehicle appears in the field of view of identification camera 120, server system 140 performs one or more of six tasks. In the first task, server system 140 detects the presence of one or more vehicles based on one or more images captured by identification camera 120. In an embodiment, server system 140 may be configured to detect the presence of a vehicle based on differences in color between the vehicle and the background, and a determination that a size of a total shape for a potential vehicle is larger than a specified minimal vehicle size adjusted for any applicable zoom level. Specifically, such an algorithm may compare colors of all the pixels in an image against each other. Pixels are divided into rows and columns (for example, an absolute location 21, 34 may represent a pixel located on Row 21 and Column 34). Since the image likely includes other non-vehicle objects such as, but not limited to, a fire hydrant, pedestrian, cars, grass, or road marking/paint, the algorithm may be configured to detect groups of pixels with similar colors (a range of colors that be considered to be similar may be specified in a system configuration, such as that similar colors may be a maximum of 2 shades difference, with reference to shades indicated by a color chart). The locations of these pixels are then mathematically computed to determine whether they form a shape larger than the minimal vehicle size (for example, a relative size of 10×30 may represent a shape measuring 10 rows by 30 columns). Vehicles appearing in images captured by identification camera 120 tend to appear to be parallelograms rather than rectangular in shape due to the viewing angle. Therefore, the determination may take this factor into account.

A further refinement could be made to accommodate "holes" or imperfections in a detected shape due to, for example, a reflection of the sun, a windshield area, or a roof rack. For example, the algorithm may specify a number of shapes of a particular minimum size up to certain distance (or pixels) away from each other, which may correspond to portions of a vehicle such as a hood, roof, and trunk, which are typically of the same color.

Once a vehicle has been detected, an entry is recorded in a portion of database 141 corresponding to identification camera 120, along with information including, for example, a date, time, color of vehicle, size of vehicle, locations of pixels, and zoom level. This information may be used in conjunction with other detections of the vehicle to identity of the vehicle. Alternatively, such information may be temporarily recorded in volatile memory, such as RAM.

In the second task, server system 140 detects the presence of license plates and/or additional identification, such as, but not limited to, decals, on vehicles in images captured by identification camera 120. Once a license plate and/or additional identification has been detected, an entry is recorded in a portion of database 141 corresponding to identification camera 120, along with information including, for example, a date, time, license plate #, state/province, decal details (for example, a type, an identifier, and expiration), locations of pixels, and zoom level. This information may be used in conjunction with other detections of the vehicle to identify the vehicle in other images, such as images captured by a destination camera.

In the third task, server system 140 identifies vehicles that are moving versus vehicles which are stationary, based on multiple images captured by identification camera 120.

In the fourth task, server system 140 identifies license plates and/or additional identifications that are moving versus license plates and/or additional identifications which are stationary, based on multiple images captured by identification camera 120. In an example, server system 140 may be configured to: (1) based on license plates and/or additional identification information obtained, such as via OCR, from the current image, find corresponding matches in previous images (for example, by reviewing data stored in database 141 or memory); and (2) once such matches are found, compare the locations of pixels between the current image and previous images, taking into account any change in zoom level. Based on such processing, one or more of the following scenarios may be detected. (A) if locations of pixels are unchanged or have unchanged below a predetermined threshold, all license plates and/or additional identifications are deemed to have remained stationary. In this scenario, a simple update of the date and time is performed for existing entries in database 141 or memory for the vehicles. (B) if pixels associated with one or more license plates and/or additional identifications are at new locations, the one or more license plates and/or additional identifications are determined to have moved. Server system 140 may calculate speed and direction of travel for these vehicles and update database 141 or memory with this information, along with updated locations. (C) if one or more license plates and/or additional identifications have disappeared from the current image, server system 140 may be configured to remove data recorded in database 141 or memory for such vehicles. (D) if one or more license plates and/or additional identifications have newly appeared in the current image, data associated with the new license plates and/or additional identifications may be recorded in database 141 or memory. In an embodiment, server system 140 may determine that one of the new vehicles corresponds to a vehicle recently determined to have disappeared, and may treat the view of the vehicle as having been temporarily obstructed. (E) if all license plates and/or additional identifications have disappeared from the current image, data from database 141 or memory from the preceding interval may be removed in connection with the license plates and/or additional identifications therein. However, some data may be retained in order to perform vehicle tracking to or from an identification camera, as discussed previously.

In the fifth task, server system 140 mates identified license plates and/or additional identifications to vehicles detected in the first task. For example, server system 140 may be configured to compare attributes of license plates and/or additional identifications (such as, for example, absolute pixel location, direction of travel, and speed) to such attributes determined for possible vehicles and attempt to mate each license plate and/or additional identification to a vehicle.

In the first through fifth tasks, server system 140 may apply machine vision techniques to identify additional identification on vehicles for the purpose of confirming that either the particular vehicle is eligibility of parking in a particular parking space, or the vehicle license registration is current and valid. These other types of unique identification include, but are not limited to: a handicap parking decal or mirror-hanger, a resident-only parking decal, and a registration decal typically adhered to license plates.

In the first through fifth tasks, OCR (optical character recognition) may be performed on any license plate image(s) in order to obtain an alphanumeric license plate number along with state/province of issue. Note the license plate observed can be either the front or the rear license plate (typically, identification cameras are provided which point both ways up and down a street). The obtained license plate information is used to obtain a unique vehicle identifier used for recording information about the vehicle in database 141. In certain configurations, the first task may be performed locally on the identification camera where the license plate number and state/province data are transmitted to the server system 140 in a concise data format. This is especially true when the underlying communications network between the identification camera 120 and server system 140 does not provide sufficient bandwidth (for example, 1 Mb/sec may be deemed a minimum threshold for streaming images) or is deemed to be too costly (for example, more than $10/MB). Multiple vehicles may be present simultaneously in identification image 121. In an embodiment, server system 140 can track up to 10 sets of vehicle license number plate information simultaneously from a single identification camera at any given time.

In the sixth task a vehicle is "tracked" as it moves across the field of view of identification camera 120. There is overlap between an image captured by identification camera 120 and a neighboring destination camera 125 such that a vehicle is within the field of vision of both cameras for a minimum of 2 seconds at a speed of 15 MPH (approximately 44 feet). In general, neighboring or nearby camera positions are determined to ensure this overlap occurs. As the two cameras have uniquely different angles of view, obtaining overlapped images of any given vehicle from both of these cameras is treated as a positive identification of the vehicle (via license plate number obtained from the identification image 121) along with an exact destination location the vehicle has occupied (in the event the vehicle parks).

In an embodiment, preliminary motion detection may be used to reduce the number of identification images which are captured and/or analyzed, as there may be significant periods of time during which no vehicles pass through the field of view of identification camera 120.

An OCR rate is only one of the useful measurements in assessing identification performance. For example, while it is impressive that of 100 license plates recorded/captured, server system 140 failed to OCR only 1 of the license plates (in other words, was not able to produce an alpha-numeric plate number), if such a configuration (including factors such as server system programming, identification camera placement, and identification camera image quality) failed to capture/register 100 other license plates (in other words, additional license plate images were not identified as such by server system 140), the overall effectiveness is only 49.5%. Furthermore, license plate recognition systems are typically tuned to read license plates from a particular state/province along with ones from a number of the surrounding states/provinces. License plates from various states/provinces have different colors and contrast for letters and background. In an embodiment, the capture rate is at least 95% and the OCR accuracy is at least 95%, yielding a minimum overall effectiveness of at least 90.25%.

Figure 3A:
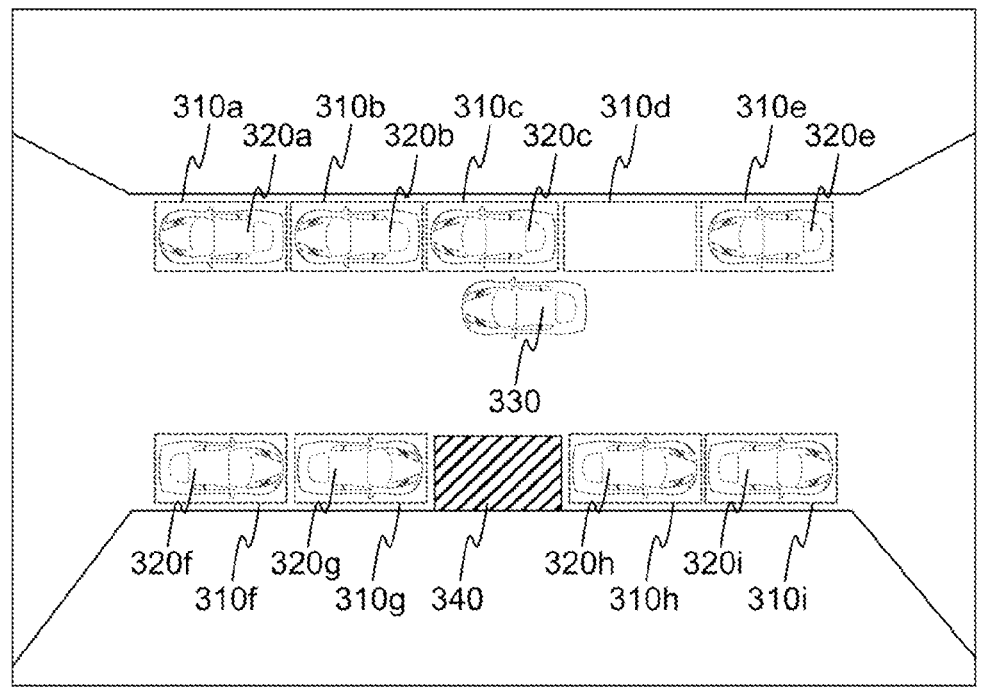
FIGS. 3A and 3B illustrate examples of images captured by destination cameras.

FIG. 3A illustrates an example of an image 126 captured by destination camera 125, where destination camera 125 is located on a façade or top of a building looking down onto a portion of an urban street, such that a top view of vehicles is seen in image 126. In association with the field of view corresponding to image 126 shown in FIG. 3A, nine appropriate destination locations 310a to 310i (such as parking spots with a hourly rate for use) have been specified to server system 140. Of these, all but destination location 310d appear to be in use by vehicles 310a to 310i. Also specified to server system 140 is inappropriate destination location 340 (such as a commercial entrance). If a vehicle is determined to have made use of destination location 340 by remaining stationary for a period of time, the vehicle will be considered in violation, resulting in server system 140 initiating actions such as, but not limited to, assessing a fine for the violation, or alerting a parking facility operator of the violation. In some embodiments, a vehicle remaining stationary in any area not identified as a destination location may be considered a violation. Also seen in image 126 is vehicle 330, in a traffic lane for vehicles traveling from right to left in the image. Taken alone, the single image does not indicate whether vehicle 330 is moving or stationary. For example, in a preceding image, vehicle 330 might have been making use of destination location 310d, and this image may cause server system 140 to determine that vehicle 330 has just completed its use of destination location 310d.

Destination images captured by destination camera 125 are used for two primary purposes: (1) identifying when destination locations are being or not being used by vehicles; and (2) determining various characteristics of vehicles, so that vehicles may be tracked as they traverse from camera to camera, by determining whether the characteristics determined from images captured by neighboring cameras correspond to one another, as discussed below in connection with FIG. 4.

Figure 3B:
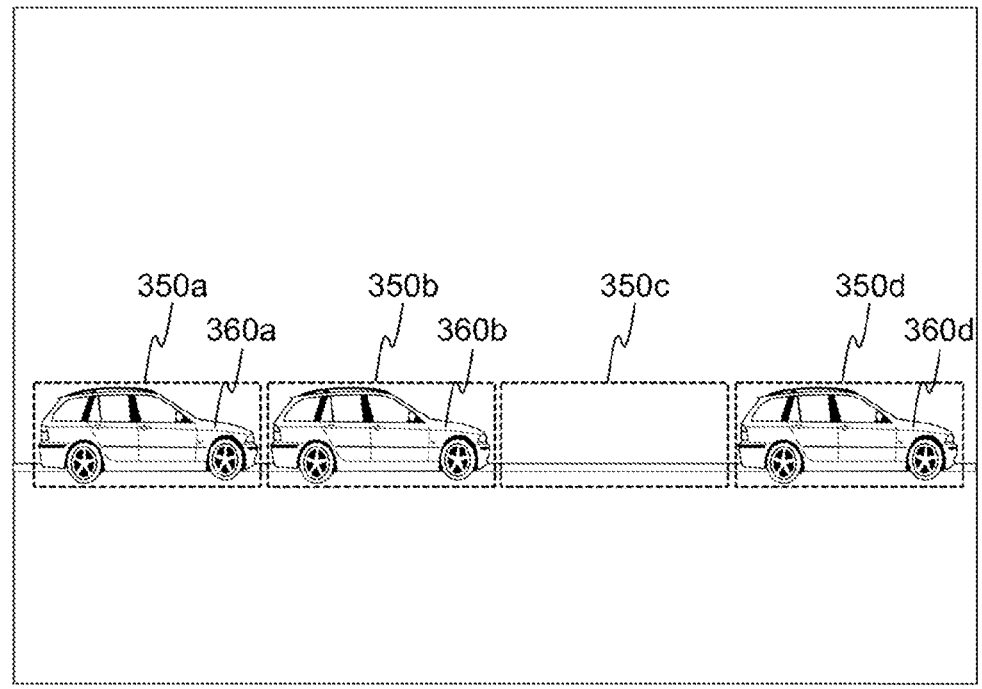

FIG. 3B illustrates an example of an image 126 captured by destination camera 125, where destination camera 125 is positioned such that a side view of vehicles is seen in image 126. Such a view may be obtained where destination camera 125 is located in onsite parking system 160, such as a parking meter, or on a building or structure opposite from one or more destination locations of interest. In association with the field of view corresponding to image 126 shown in FIG. 3B, four appropriate destination locations 350a to 350d (such as parking spots with a hourly rate for use) have been specified to server system 140. Of these, all but destination location 350c appear to be in use by vehicles 360a to 360d.

In another example, not illustrated in the drawings, destination camera 125 may be positioned such that image 126 provides a perspective view of one or more destination locations. Although FIGS. 3A and 3B illustrate the specification of rectangular areas 310 and 350 for destination locations, other shapes may be used, such as polygons (which is useful where destination camera 125 is positioned such that a destination location is seen in perspective). The GUI described below in connection with FIGS. 6A and 6B may also be configured to provide user interface elements which may be used to specify, with an overlay on an image feed, the position and extent of destination locations within the field of view of a camera. Additionally, the GUI may provide tools for assigning identifiers for destination locations, and possibly various characteristics about destination locations, such as, but not limited to, whether they are parking spaces, "no parking" locations, and time- and/or date-based restrictions on use.

In an embodiment, when a vehicle appears in the field of view of destination camera 125, server system 140 performs two tasks. For the first task, server system 140 may be configured to: (1) be aware of any and all vehicles present in the field of view of destination camera 125; (2) distinguish moving from stationary vehicles; (3) identify a time at which a moving vehicle becomes stationary in an area of the field of view corresponding to a destination location; (4) identify which destination location(s) each stationary vehicle is occupying; (5) keep track of how long each vehicle has occupied its respective destination location(s); (6) identify a time at which a stationary vehicle vacates an area of the field of view corresponding to a destination location; (7) determine when use of a destination location conflicts with restrictions established for the destination location; (8) identify which street or block a vehicle is improperly parked; (9) track an amount of time each vehicle has been improperly parked; and (10) track a time at which a vehicle ceases to be illegally parked. Various types of destination locations, each having respective restrictions, for wheeled motor vehicles include, but are not limited to: no parking areas (anytime, fire lane, fire hydrant), no parking during specified times and/or days (for example, during rush hour or street cleaning), no parking/stopping/standing, limited-time parking (for example, 2 hour time limit), parking restricted to classes of vehicles (taxi stand, bus stop, loading zone/commercial vehicles only), permitted parking (handicapped or resident-only parking), pick-up and drop-off only locations, and street intersections (for anti-gridlock "block the box" moving violations in which a vehicle remains within an intersection during a red light for the vehicle's direction of travel). Server system 140 may be configured to detect other parking violations, such as, but not limited to, parking within a specified distance of an intersection, parking in a bike lane or crosswalk or other pedestrian zone, not within a space for a single destination location, more than a specified distance from a curb, parking in or in front of a driveway, use of an island or center strip, vehicle parked facing the wrong direction, abandoned vehicle (stationary for more than a specified number of days), oversize vehicles, incorrect class of vehicle (such as a camper, trailer, or boat for more than a specified number of hours in a given number of days). A destination location may also be subject to a reservation, where an end user reserves exclusive use of a destination location for a specified period of time. Server system 140 may also be configured to detect double parked vehicles, while distinguishing vehicles stopping in traffic lanes due to driving conditions from improperly double parked vehicles. Server system 140 may also be configured to recognize, and in some cases distinguish, smaller wheeled vehicles such as motorcycles, scooters, and "smart cars."

In the second task the vehicle is "tracked" as it moves across the field of view of destination camera 125. There is overlap between an image captured by destination camera 125 and a neighboring identification or destination camera such that a vehicle is within the field of vision of both cameras for a minimum of 2 seconds at a speed of 15 MPH (approximately 44 feet). In general, neighboring camera positions are determined to ensure this overlap occurs. As the two cameras have uniquely different angles of view, obtaining overlapped images of any given vehicle from both of these cameras is treated as a positive identification of the vehicle (via license plate number obtained from the identification image 121) along with the exact parking space the vehicle has occupied (in the event the vehicle parks).

Figure 4:
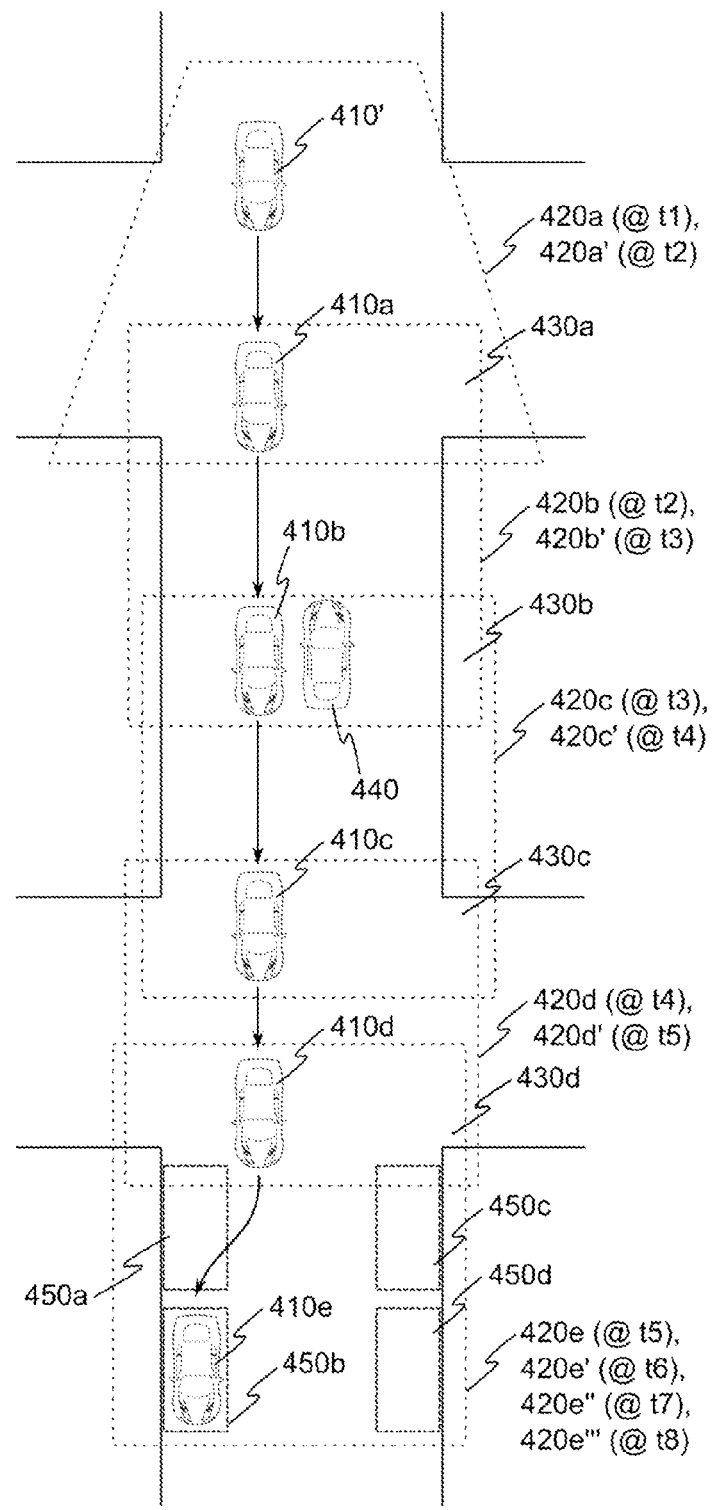
FIG. 4 illustrates how images captured by cameras with overlapping fields of view may be used to identify a vehicle, track the movement of the vehicle to a destination location, and identify use of the destination location by the vehicle.

In some configurations, a destination camera may be positioned to monitor vehicle movement in a particular area, where the area does not include any destination locations of interest to server system 140. Such an area may be located, for example, between two areas each containing destination locations of interest. In this example, images captured by the destination camera may overlap images captured by cameras corresponding to these two areas, and can be used for a "handoff" procedure as illustrated in FIG. 4, discussed below.

In an embodiment, destination camera 125 may have pan, tilt, and/or zoom capability, which may be used for server system 140 to obtain a more detailed view of a destination location, or may be used by parking facility operator personnel via a user interface on parking operation system 190 to monitor particular areas of interest viewable by destination camera 125. In such an embodiment, server system 140 may be configured to perform a coordinate transformation in order to monitor usage of destination locations and accurately determine vehicle characteristics while varying the field of view of destination camera 125.

In an embodiment, preliminary motion detection may be used to reduce the number of destination images which are captured and/or analyzed, as there may be significant periods of time during which no vehicles pass through the field of view of destination camera 125.

In an embodiment, accurate date and time stamps are included in all images captured by identification cameras and destination cameras to facilitate later manual review of stored images, should such a need arise.

In an embodiment, some amount of "grace period" is given to vehicles after they are determined to have become stationary within an appropriate destination location (in contrast to an inappropriate destination location, such as a no parking zone). When a driver leaves the vehicle to pay for parking, even though it has been determined that the vehicle has begun use of a destination location with no payment made, some grace period is needed to delay the determination that the vehicle is in violation of a paid use requirement since some amount of time is required to complete the payment process.

FIG. 4 illustrates how images captured by cameras with overlapping fields of view may be used to identify a vehicle, track the movement of the vehicle to a destination location, and identify use of the destination location by the vehicle. FIG. 4 is not presented to scale; for example, overlapping area 430a nominally would extend 44 feet or more in the vertical direction, but it is illustrated as approximately the same size as vehicle 410. First, at time t1 an identification camera (not illustrated) captures identification image 420 covering the field of view illustrated in FIG. 4. Included in identification image 420 is vehicle 410 at the location designated 410'. Based on image 420a (and perhaps additional images captured by the identification camera prior to time t1), server system 140 determines a unique identifier for vehicle 410. For example, by performing OCR on one or more detected images of a license plate to obtain a license plate number from which the unique identifier can be obtained. Server system 140 records in database 141, in connection with the unique identifier that vehicle 410 was observed by the identification camera at time t1. In an alternative embodiment, server system 140 instead stores in volatile memory that vehicle 410 was observed by the identification camera at time t1, and such information is recorded in database 141 after a determination that vehicle 410 has made use of a destination location prior to vehicle 410 being identified by server system 140 via identification images obtained from an identification camera other than the identification camera which captured identification image 420.

At time t2, the identification camera captures another identification image 420a' of vehicle 410 at the location designated 410a. At approximately time t2, a first destination camera captures destination image 420b of vehicle 410 within overlap area 430a (for example, at approximately the location 410a). In some embodiments, the identification camera and the first destination camera are synchronized, such that images 420a' and 420b are both captured at essentially the same time t2. Overlap area 430a corresponds to the field of view of identification image 420a' which overlaps the field of view of destination image 420b. In both images 420a' and 420b, images of vehicle 410 have been captured while vehicle 410 is within overlap area 430a.

Based on one or more identification images captured by the identification camera (such as identification image 420a'), server system 140 determines a plurality of characteristics Ca for vehicle 410. As noted above, fixed characteristics for vehicle 410 and recorded in database 141 may be included in Ca. Examples of the characteristics include, but are not limited to: a speed of travel for vehicle 410, a direction of travel for vehicle 410, a position of a vehicle in a vehicle image (including, for example, a lane of traffic vehicle 410 is traveling in), a color of vehicle 410, and a size or dimension of vehicle 410. Some characteristics may be considered static characteristics of vehicle 410, and are not expected to change over time (for example, vehicle color or size). Other characteristics may be considered dynamic characteristics of vehicle 410, and may change significantly over time (for example, vehicle speed or lane of travel). In an embodiment, static characteristics may be recorded in database 141 as fixed characteristics of vehicle 410 in connection with the unique identifier determined based on identification image 420a. These fixed characteristics may be determined based on vehicle information provided by an end user (such as make, model, year, and color), or they may be based on vehicle images captured during a previous encounter between vehicle 410 and server system 140. The fixed characteristics may be used in connection with determining a unique identifier for vehicle 410, by ensuring that static characteristics determined from identification images correspond to the fixed characteristics. The fixed characteristics may also be included in Ca or other pluralities of characteristics where a vehicle identification has been confirmed. Based on destination image 420b, and possibly other destination images captured by the first destination camera, server system 140 determines a plurality of characteristics Ca' for vehicle 410. Due to factors such as the different angles of view of vehicle 410 for the identification camera and the first destination camera, and obstructing vehicles, Ca and Ca' may consist of different, but typically overlapping, sets of vehicle characteristics. For example, a vehicle width may be determined for Ca but not Ca' due to a partial obstruction of vehicle 410 from the point of view of the first destination camera around time t2. Additionally, image distortion, which is typically more significant at the borders or images, or other factors may result in some vehicle characteristics, such as speed or size, only being approximate values. Normalization of characteristics such as size, speed, and direction of travel may be performed to compensate for camera positioning and zoom level.

Server system 140 then determines whether Ca' corresponds to Ca by comparing the values of the vehicle characteristics included in both Ca and Ca'. As vehicle characteristics determined by server system 140 may be approximations of the actual characteristics of vehicle 410, an approximate equivalence between values, where such equivalence is demonstrated for all of the compared characteristics, is sufficient to support a determination that Ca' corresponds to Ca. If Ca' is determined to correspond to Ca, then server system 140 records in database 141, in connection with the unique identifier, that vehicle 410 was observed by the first destination camera at time t2. In an alternative embodiment, server system 140 instead stores in volatile memory that vehicle 410 was observed by the first destination camera at time t2, and such information is recorded in database 141 after a determination that vehicle 410 has made use of a destination location prior to vehicle 410 being identified by server system 140 via identification images obtained from an identification camera other than the identification camera which captured identification image 420. This avoids writing vehicle location information to database 141 that is not required to demonstrate that a use of a particular destination location by vehicle 410.

At time t3, the first destination camera captures another destination image 420b' of vehicle 410 at the location designated 410b. At approximately time t3, a second destination camera captures destination image 420c of vehicle 410 within overlap area 430b (for example, at approximately the location 410b). In some embodiments, the first destination camera and the second destination camera are synchronized, such that images 420b' and 420c are both captured at essentially the same time t3. Overlap area 430b corresponds to the field of view of destination image 420b' which overlaps the field of view of destination image 420c. In both images 420b' and 420c, images of vehicles 410 and 440 have been captured while vehicles 410 and 440 are within overlap area 430b.

Based on one or more destination images captured by the first destination camera (such as identification image 420b'), server system 140 determines a plurality of characteristics Cb for vehicle 410. As noted above, fixed characteristics for vehicle 410 and recorded in database 141 may be included in Cb. Based on destination image 420c, and possibly other destination images captured by the second destination camera, server system 140 determines a plurality of characteristics Cb' for vehicle 410. Additionally, due to the inclusion of vehicle 440 in destination image 420c, a plurality of vehicle characteristics Cx are determined for vehicle 440. Differences in dynamic vehicle characteristics between Cb' and Cx would result due to vehicle 440 traveling in the opposite direction in a different lane of travel. Server system 140 then determines whether Cx corresponds to Cb, which should not occur. Server system 140 then determines whether Cb' corresponds to Cb. If Cb' is determined to correspond to Cb, then server system 140 records in database 141, in connection with the unique identifier, that vehicle 410 was observed by the second destination camera at time t3. In an alternative embodiment, server system 140 instead stores in volatile memory that vehicle 410 was observed by the second destination camera at time t3, and such information is recorded in database 141 after a determination that vehicle 410 has made use of a destination location prior to vehicle 410 being identified by server system 140 via identification images obtained from an identification camera other than the identification camera which captured identification image 420.

At time t4, the second destination camera captures another destination image 420c' of vehicle 410 at the location designated 410c. At approximately time t4, a third destination camera captures destination image 420d of vehicle 410 within overlap area 430c (for example, at approximately the location 410c). In some embodiments, the second destination camera and the third destination camera are synchronized, such that images 420c' and 420d are both captured at essentially the same time t4. Overlap area 430c corresponds to the field of view of destination image 420c' which overlaps the field of view of destination image 420d. In both images 420c' and 420d, images of vehicle 410 have been captured while vehicle 410 is within overlap area 430c.

Based on one or more destination images captured by the second destination camera (such as identification image 420c'), server system 140 determines a plurality of characteristics Cc for vehicle 410. As noted above, fixed characteristics for vehicle 410 and recorded in database 141 may be included in Cc. Based on destination image 420d, and possibly other destination images captured by the third destination camera, server system 140 determines a plurality of characteristics Cc' for vehicle 410. Server system 140 then determines whether Cc' corresponds to Cc. If Cc' is determined to correspond to Cc, then server system 140 records in database 141, in connection with the unique identifier, that vehicle 410 was observed by the third destination camera at time t4. In an alternative embodiment, server system 140 instead stores in volatile memory that vehicle 410 was observed by the third destination camera at time t4, and such information is recorded in database 141 after a determination that vehicle 410 has made use of a destination location prior to vehicle 410 being identified by server system 140 via identification images obtained from an identification camera other than the identification camera which captured identification image 420. In an embodiment, a second identification camera may be responsible for capturing image 420d, but is unable to obtain an image of a license plate for vehicle 410, in which case characteristics of vehicle observed via the second identification camera are used to confirm that the vehicle observed in overlap area 430c around area 410c is vehicle 410. This illustrates that it is not significant whether it is a destination camera or an identification camera which is used for tracking vehicle 410 as it moves away from the initial identification camera. When used in connection with such tracking, these cameras may be broadly referred to as "tracking cameras."

At time t5, the third destination camera captures another destination image 420d' of vehicle 410 at the location designated 410d. At approximately time t5, a fourth destination camera captures destination image 420e of vehicle 410 within overlap area 430d (for example, at approximately the location 410d). In some embodiments, the third destination camera and the fourth destination camera are synchronized, such that images 420d' and 420e are both captured at essentially the same time t5. Overlap area 430d corresponds to the field of view of destination image 420d' which overlaps the field of view of destination image 420e. In both images 420d' and 420e, images of vehicle 410 have been captured while vehicle 410 is within overlap area 430d.

Based on one or more destination images captured by the third destination camera (such as identification image 420d'), server system 140 determines a plurality of characteristics Cd for vehicle 410. As noted above, fixed characteristics for vehicle 410 and recorded in database 141 may be included in Cd. Based on destination image 420e, and possibly other destination images captured by the fourth destination camera, server system 140 determines a plurality of characteristics Cd' for vehicle 410. Server system 140 then determines whether Cd' corresponds to Cd. If Cd' is determined to correspond to Cd, then server system 140 records in database 141, in connection with the unique identifier, that vehicle 410 was observed by the fourth destination camera at time t5. In an alternative embodiment, server system 140 instead stores in volatile memory that vehicle 410 was observed by the fourth destination camera at time t5, and such information is recorded in database 141 after a determination that vehicle 410 has made use of a destination location prior to vehicle 410 being identified by server system 140 via identification images obtained from an identification camera other than the identification camera which captured identification image 420.

In association with the field of view for image 420e illustrated in FIG. 4, four appropriate destination locations 450a to 450d (such as parking spots with a hourly rate for use) have been specified to server system 140. At time t6, destination image 420e' is captured by the fourth destination camera, at a time when vehicle 410 is at location 410e. Based on destination image 420e', server system 140 determines that vehicle 410 is within the rectangular region specified for destination location 450b. At time t7, destination image 420e" is captured by the fourth destination camera, with vehicle 410 remaining at location 410e. Based on destination image 420e", server system 140 again determines that vehicle 410 is within the rectangular region specified for destination location 450b, accordingly determines that vehicle 410 began use of destination location 450b beginning at time t6, and records this information in database 141. At time t8, destination image 420e''' is captured by the fourth destination camera, at a time when vehicle 410 has exited destination location 450b. Based on destination image 420e''', server system 140 determines that vehicle 410 is no longer within the rectangular region specified for destination location 450b, accordingly determines that vehicle 410 completed its use of destination location 450b at time t8. Based on information as to restrictions applicable to use of destination location 450b from the time period t6 to t8, such as, for example, an hourly rate for use of the destination location 450b, server system 140 can initiate actions such as billing an end user account for this use of destination location 450b, or such as levying a fine for improper use of destination location 450b.

Server system 140 is also configured to correctly identify a vehicle which has made use of a destination location where server system 140 first determines that a vehicle has made use of a destination location, and then later is able to capture a vehicle identification via an identification camera. This situation may occur where, for example, a view of a vehicle is obstructed as it passes by an identification camera, or a restart of server system 140 results an identification of the vehicle not being made previously. As an example, if at time t0, before time t1, the fourth destination camera were to first determine that vehicle 440 was making use of destination location 450c, but not have an identification for vehicle 440, a temporary unique identifier would be assigned to vehicle 440, and entries recorded in database 141 in connection with the temporary identifier. Sets of vehicle characteristics would be determined for vehicle 440 while it made use of destination location 450c, as well as when it passed through overlap areas 430d, 430c, 430b, and 430a, and the correspondence of these sets of characteristics would be performed much in the same manner described above, to determine and record that the same vehicle 440 associated with the temporary identifier, was still being observed. Once observed by the first identification camera while located in overlap area 430a, server system 140 would be able to determine a correct unique identifier for vehicle 440. At that point, records previously recorded in database 141 under the temporary identifier can be modified or stored again under the correct unique identifier for vehicle 440, which the use of destination location 450c properly associated with that identifier. An alternative mechanism for obtaining an identification of vehicle 440 after time t0 is to dispatch mobile device 150 to capture one or more identification images of vehicle 440 while it is making use of destination location 450c. Dispatch of mobile device 150 may be designated a higher priority where the use of destination location 450c by vehicle 440 is determined to conflict with restrictions associated with use of destination location 450c.

Server system 140 receives images from the identification and destination cameras and interpolates the identities of parked vehicles. Server system 140 may then retrieve parking payment information (such as, but not limited to, duration of paid parking and time of expiration) from a third-party parking payment system via an API (application programming interface). If a vehicle parking status is determined to be either unpaid or expired, the server system 140 transmits this information to the third-party parking payment system via an API. The parking facility operator which runs the third-party payment system can then follows its Standard Operating Procedures (SOP) in dealing with parking violations (such as, but not limited to, mailing a parking violation ticket, installing a wheel clamp on the vehicle, or towing the vehicle upon repeated or severe parking violations).

Vehicle detection by server system 140 may be configured to perform several functions: (1) detecting the presence and location of vehicles in video frames; (2) distinguishing moving vehicles from stationary vehicles; (3) identifying whether particular detected vehicles are occupying destination locations, such as parking spaces or no-parking areas; (4) determine a time at which a vehicle begins to occupy or vacates a destination location; (5) track vehicles as they travel from the field of view of one tracking camera to another, and raise an exception if an error in this tracking is determined to have occurred. In an embodiment, server system 140 may also be configured to identify whether particular vehicles are displaying an appropriate indicator for access or use of a destination location. Examples of such indicators include, but are not limited to, a handicapped parking hanger or decal, or a parking hanger or decal indicating authorized use of a "resident only" parking location. A camera may be zoomed in to more clearly capture images of such indicators. In an embodiment, a vehicle identifier, such as a license plate, may be used to determine appropriate access or use of a destination location, and obviate the need for a separate indicator.

In an example implementation, server system 140 may be programmed to use threads to carry out its tasks for identification and destination cameras. For example, a "video_receiver" thread may handle the reception of a video and/or image stream from an identifier or destination camera and store raw video and/or image information. This may be with one thread per video and/or image stream or multiple video and/or image streams. Configurable options for this thread may include (1) store to file, (2) store to memory, (3) store to memory and file, (4) a retention time for video data (for example, 4 hours)). Another example is a thread to detect vehicle color, shape, location, lane position, speed/direction of travel, whether a vehicle location is in a handoff zone (and which one), camera identification, and storing such information in database 141. This thread would examine each multiple video frames to determine updated locations and speed/direction of travel of vehicles and storing such information in database 141. There may be one thread per video and/or image stream or multiple video and/or image streams. Another example is a thread which confirms a particular vehicle detected as exiting via a handoff zone is detected by a nearby camera. This may be done, for example, by reviewing the database 141 for a particular camera based on in which handoff zone the vehicle was detected and/or a detected direction of travel for the vehicle. There may be one thread per video and/or image stream or multiple video and/or image streams. Another example is a thread to determine whether a vehicle is occupying a destination location by remaining stationary at that destination location, along with a time when vehicle begins to occupy or vacates the destination location. There may be one thread per video and/or image stream or multiple video and/or image streams.

Many machine vision techniques are known in the art which may be used for detecting the presence of vehicles in video frames. For example, there are various known edge detection algorithms which may be used for detecting the presence of vehicles. As an example, an algorithm may detect the presence of a vehicle based on differences in color between the vehicle and the background, and whether a size of a total shape is larger than a minimum vehicle size expected in consideration of zoom level and/or location in a field of vision. For example, the algorithm may compare colors of pixels in a video stream snapshot against each other. Since an image likely includes various non-vehicle objects such as a fire hydrant, pedestrian, grass, road markings, and paint, the algorithm may detect groups of pixels with similar colors (with a configurable range of variation in color considered to be a match). The number and location of pixels in the total shape are used to determine whether the shape is larger than the minimum vehicle size. The algorithm may further accommodate "holes" or imperfections in the shape, which may occur due to specular reflections or highlights, for example. Additionally, the algorithm may determine whether a number of shapes of respective minimum sizes are within certain distances of each other. These shapes may correspond to, for example, hood, roof, and trunk portions of a vehicle, which are typically of the same color.

A boundary condition may occur where there is insufficient contrast or difference in color between a vehicle and the background, in which detection may fail. For example, a black vehicle against black asphalt. Further refinements, to camera hardware and/or the algorithm, may be introduced to address this boundary condition. For example, a camera that performs both visible light and thermal imaging may be used, which obtains a heat signature of a vehicle that has begun occupying a destination location. In this example, the engine compartment would have a different thermal profile than its surrounding even though both the vehicle and the backdrop are black in color. Further cost-benefit analysis would determine whether the benefits gained from such an approach justifies the incremental cost, as well as taking in account any boundary conditions caused by the thermal imaging process can be sufficiently addressed (such as by the visible light captured by the camera).

Although the presence and many characteristics of a vehicle can be recognized from a single image, multiple images are needed and used to determine, for example, if the vehicle is stationary or moving. In an example, server system 140 may be configured to: (1) based on determinations of color and size of vehicles in the current image, find corresponding matches in previous images (for example, by reviewing data stored in database 141 or memory); and (2) once such matches are found, compare the locations of pixels between the current image and previous images, taking into account any change in zoom level. Based on such processing, one or more of the following scenarios may be detected. (A) if locations of pixels are unchanged or have unchanged below a predetermined threshold, all vehicles are deemed to have remained stationary. In this scenario, a simple update of the date and time is performed for existing entries in database 141 or memory for the vehicles. (B) if pixels associated with one or more vehicles are at new locations, then the one or more vehicles are determined to have moved. Server system 140 may calculate speed and direction of travel for these vehicles and update database 141 or memory with this information, along with updated locations. (C) if one or more vehicles have disappeared from the current image, server system 140 may be configured to remove data recorded in database 141 or memory for such vehicles. (D) if one or more vehicles have newly appeared in the current image, data associated with the new vehicles may be recorded in database 141 or memory. In an embodiment, server system 140 may determine that one of the new vehicles corresponds to a vehicle recently determined to have disappeared, and may treat the view of the vehicle as having been temporarily obstructed. (E) if all vehicles have disappeared from the current image, data from database 141 or memory from the preceding interval may be removed in connection with the vehicles therein. However, some data may be retained in order to perform vehicle tracking to or from an identification camera, as discussed previously.

In an example, an algorithm for identifying which vehicles are occupying destination areas is similar to the basic vehicle detection algorithm. Once vehicle detection is completed, server system 140 evaluates whether pixel locations corresponding to a vehicle occupy any of the pre-mapped visual regions. A degree of overlap may be configurable. In an embodiment, a vertical offset may be applied to compensate for vehicle height and compensate for a visual obstruction, such as a parked vehicle, between a destination camera and the vehicle. Such obstructions may frequently occur in dense parking lots, for example. Also, server system 140 determines whether the vehicle has remained stationary for at least a certain amount of time. Once it is determined that a vehicle has dwelled in a given destination location for at least the certain amount of time, identification information for the vehicle, the destination location, and a time and date at which the vehicle began to make use of the destination are recorded in database 141, preferably in non-volatile storage. In an embodiment, server system 140 may be configured to detect when a vehicle takes up multiple destination locations, such as by occupying two parking spaces. This may result in, for example, issuance of one or more parking citations or increased usage fees. Server system 140 may also determine when the vehicle vacates the destination location, and record corresponding information in database 141. Also, server system 140 may be configured to determine when user of the destination location by the vehicle will soon exceed, or has exceeded, a period of time for use of the destination location, such as may occur in connection with a parking spot with a two-hour maximum parking duration, a destination location not available for vehicle use after a specified time for street sweeping, or the exhaustion of funds provided for the vehicle.

In an embodiment, server system 140 may be configured to recognize one or more multi-vehicle destination locations, which may be used by more than one vehicle at a time. For example, server system 140 may be configured to support tracking for "long block" parking of vehicles, in which a parking area controlled by, for example, a single Pay-by-Space, Pay-and-Display, or Pay-by-Plate unit is provided along the length of a curb for a city block, but the parking area is not divided into marked parking spaces; instead, vehicles can make use of any available space along the curb (excluding certain "no parking" regions, such as, but not limited to, loading zones and driveways). In another example, server system 140 may be configured to track use of a parking lot, but not a plurality of individually marked spaces therein, controlled by, for example, a single Pay-and-Display unit. Although server system 140 may not be configured to track use of a multi-vehicle destination location on a space by space basis, server system 140 may determine and record the position of a vehicle within the multi-vehicle destination location for tracking the vehicle's use over time and for parking enforcement activities, such as attaching a citation to a vehicle which has exceeded its permitted use of the multi-vehicle destination location. In an embodiment, server system 140 may be configured to determine a length of a vehicle making use of a multi-vehicle destination location, as a greater parking fee and/or fine may imposed for the use of space that otherwise could be occupied by more than one vehicle. One benefit of using the server system 140 described in this application is that whereas conventional controlled parking lots might rely on a single point of ingress and egress for controlling use of the lot, tracking by use of cameras allows for a parking lot with multiple entrances and exits and a more "open" design, as vehicles do not need to be confined by wall of fencing.

In an embodiment, multiple noncontiguous destination locations or multi-vehicle destination locations may be aggregated into a single multi-vehicle destination location. This may include where two constituent destination locations are covered by different destination cameras. This may be useful where, for example, a multi-vehicle destination location is broken up by various "no parking" destination locations along the length of a city block.

In an embodiment, there may be a restricted destination location (such as a "no parking" overlaying a multi-vehicle destination location, so as to "carve out" restricted areas of the multi-vehicle location. For example, in the "long block" scenario discussed above, a single multi-vehicle destination location may be defined along the entire length of a city block, with "no parking" destination locations overlaying various portions along the city block, such as, but no limited to, loading zones and driveways along the length of the block. A vehicle detected by server system 140 as making use of one of the "no parking" destination locations will be determined by server system 140 as having committed a parking violation, despite the vehicle also have been within the larger multi-vehicle destination location.

In an embodiment, a computer-based configuration utility may be provided. For example, mobile device 150 or manual review system 180 may be configured with a configuration utility, allowing for on-site or remote configuration. For example, mobile device 150 may be used by a person performing camera installation, in order to provide feedback as to the effectiveness of a camera configuration for vehicle identification, tracking, and/or detection. Alternatively or in addition, certain system or camera configuration changes may be made via manual review system 180 as a result of configuration shortcoming identified during use of manual review system 180. In an embodiment, a user interface may be made available via a web browser. The configuration utility may provide one or more features such as, but not limited to:

Providing a graphical user interface (GUI) to perform calibration of vehicle detection for a given camera.

Providing a GUI for ensuring contiguous camera alignment.

Providing a GUI for specifying minimal vehicle dimensions. This may be in terms of pixels and adjusted for zoom level.

Providing a GUI for identifying a portion of a camera's field of view which overlaps with the field of view of another camera.

Providing a GUI for aligning a camera and/or specifying camera orientation and/or alignment.

Providing a GUI for pre-mapping destination locations.

Defining circumstances which are considered vehicle parking violations. Such circumstances may be particular to a given region or location.

Configure outcomes for various parking violations. For example, information about a violation may be simply displayed on a screen, registered owner information may be obtained for issuing a citation or bill, or a warning may be printed and placed on a vehicle.

Configuring an expiration period after which a new request for vehicle owner registration information must be made, such to a state-run motor vehicle agency, before issuing a parking citation by way of mail or otherwise.

Provide a GUI for other system configuration parameters to be reviewed and modified.

To perform calibration of vehicle detection for a given camera, a GUI presents two image feeds and allows an administrator to superimpose rulers on each image feed. A zoom level, if any, may be displayed as part of the GUI, as may be a control for modifying the zoom level. The two image feeds originate from the given camera and another camera with an overlapping field of vision (such cameras are often adjacent to each other). Preferably, for calibration the capture of images for the two cameras is synchronized such that images are captured at the same time, allowing for review of a vehicle's position in each video feed, such as when it passes through the overlapping area of the two cameras' fields of vision. The configuration utility may also provide, by way of the GUI, temporal image control functions such as pause, play, rewind, fast forward, freeze frame advance, freeze frame reverse, and goto frame functions.

For calibration, the configuration utility may be used to find one or more vehicles of known make and model in one or both image feeds (this might include, for example, a vehicle used by a technician operating the configuration utility), and position one or more rulers in the GUI such that the rulers indicate the correct length, width, and/or height of the vehicles by reference to known values for these dimensions for the vehicles being measured. In an embodiment, the ruler function provided by the GUI is configured to compensate for nonlinearities due to factors such as visual distortion introduced by the camera (which may have known characteristics based on a camera model, for example) or the perspective of the captured image. For example, ruler markings indicating units of distance may be spaced closer on a right-hand side of an image where vehicles captured in that area are further away from the camera than those captured in the left-hand side of the image. The configuration utility may be configured to allow for on-site calibration of such nonlinearities for a given camera by identifying markers in an image, and specifying positions and/or distances (relative to other markers and/or the camera). Such markers may be temporarily, or in some cases permanently for the purpose of later recalibration, placed by a technician.

Figure 6A:
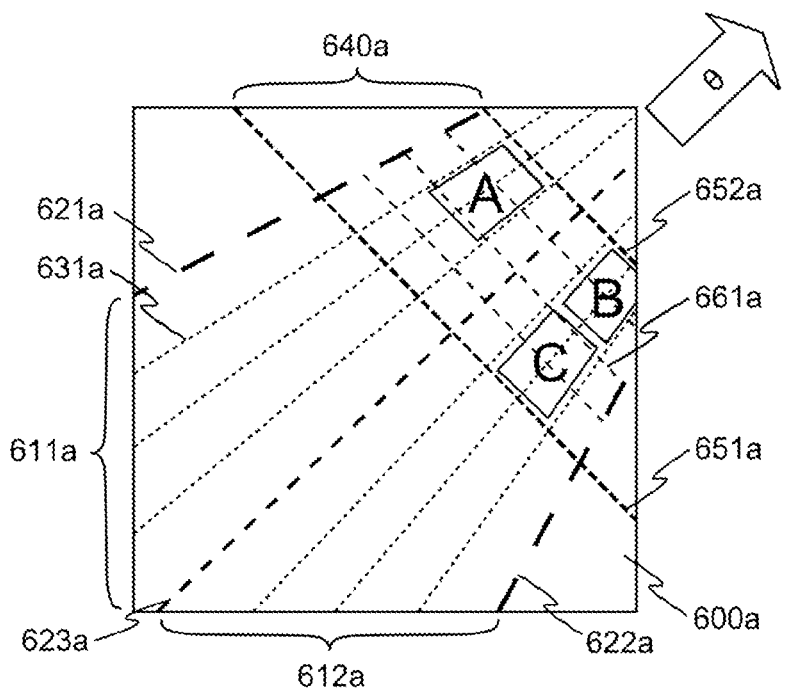
FIGS. 6A and 6B illustrate aspects of a graphical user interface (GUI) for specifying characteristics of a camera's field of view.
Figure 6B:
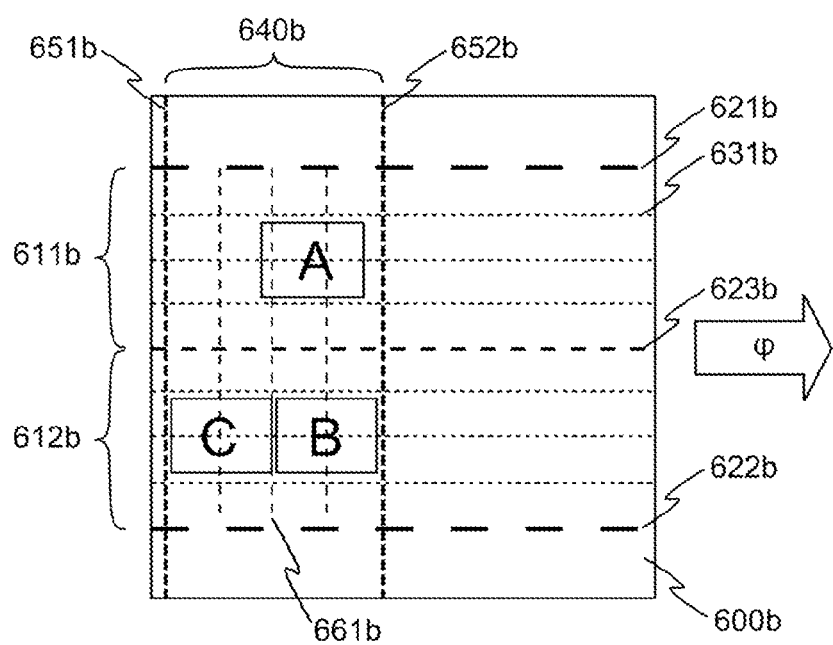

Also, the configuration utility may be used to specify relationships between directions of travel in the two image feeds, as well as identify pixels or image locations corresponding to common points in the two image feeds. In an embodiment, locations and directions of travel may be specified for lanes/paths of traffic in each of the image feeds, and correlated between the two images feeds (allowing, for example, later determination of when a vehicle passes from the field of one camera to another within the same lane/path of traffic). Specification of these features may be done via the GUI, for example by allowing for the overlay of lines or other indicators on the image feeds indicating lane/path boundaries. FIGS. 6A and 6B illustrate aspects of an example GUI. FIG. 6A illustrates a portion of the GUI in which an image 600a from a first camera is displayed. FIG. 6B illustrates a portion of the GUI in which an image 600b from a second camera is displayed. The field of views of the images 600a and 600b overlap, with the area of overlap including areas 640a and 640b. Also captured in images 600a and 600b are two lanes/paths of traffic, labeled as lanes/paths 611a and 612a in FIG. 6A, and lanes/paths 611b and 612b in FIG. 6B. In this particular example illustrated in FIGS. 6A and 6B, traffic proceeds in the same direction (generally corresponding to angle θ) in lanes/paths 611a and 611b, although in a similar example traffic might proceed in opposing directions in lanes/paths 611a and 611b Also captured in images 600a and 600b are images of three vehicles, respectively labeled A, B, and C. In FIG. 6A, lane/path boundaries have been specified with the dashed lane/path boundary indicators 621a, 622a, and 623a, which may be added, placed, moved, labeled, and otherwise identified by use of the GUI. In FIG. 6A, two traffic lanes/paths have been specified using the GUI: the lane/path 611a between lane/path boundary indicators 621a and 623a, and the lane/path 612a between lane/path boundary indicators 622a and 623a. In the particular example illustrating in FIG. 6A, traffic proceeds in lanes/paths 611a and 612a in the same direction θ, and lane/path boundary indicators 621a and 622a are of a first type (illustrated by the similar dashed lines), and lane/path boundary indicator 623a is of a second type indicating the division of the area of unidirectional traffic flow between lane/path boundary indicators 621a and 622a into the two lanes/paths 611a and 612a. The configuration utility may be configured to automatically provide or suggest identifiers for the specified lanes for cross referencing with, for example, lanes identified in connection with other cameras, such as lanes/paths 611b and 612b illustrated in FIG. 6B. In FIG. 6B, the configuration utility provides similar facilities for lane/path identification, with lanes/paths 611b and 612b, and lane/path boundary indicator lines 621b, 622b, and 623b corresponding to their counterparts in FIG. 6A described above.

In an embodiment, each lane/path of traffic may be divided into a number of smaller segments. These segments may be specified via the GUI, for example by allowing for the overlay of lines or other indicators on the image feeds indicating the segments. In an embodiment, the overlaid lines may be used to aid in automatically characterizing nonlinearities in image feeds. FIG. 6A illustrates an example, with lane/path segment indicator 631a and other similar unlabeled lane/path segment indicators. The configuration utility may be configured to automatically generate suggested lane/path segment indicators based on previously specified lane/path boundary indicators, and provide via the GUI tools for adjusting the lane/path boundary indicators as desired. Also, the inclusion of vehicle images, such as vehicles A, B, and C shown in FIG. 6A, may aid a technician in accurately placing or adjusting lane/path segment indicators. FIG. 6B illustrates lane/path segment indicator 631b and other similar unlabeled lane/path segment indicators corresponding to their counterpart in FIG. 6A described above.

The configuration utility may also provide similar features via the GUI for specifying an area of an image stream with an overlapping field of view with a respective area of a second image stream. As these areas are used for "handing off" the detection of a vehicle from one tracking camera to another, these areas may be referred to as "handoff zones." For example, FIGS. 6A and 6B illustrate images captured by cameras with overlapping fields of view, in which the field of view for handoff zone 640a overlaps the field of view for handoff zone 640b. The GUI may be configured to allow for specification of handoff border indicators 651a and 652a in FIG. 6A, and respective handoff border indicators 651b and 652b in FIG. 6B. Also, a specified handoff zone may be divided into a number of smaller segments, using handoff segment indicators 611a and 611b (and other unlabeled handoff segment indicators) illustrated in FIGS. 6A and 6B. The configuration utility may be configured to automatically generate suggested handoff segment indicators based on previously specified handoff boundary indicators, and provide via the GUI tools for adjusting the handoff boundary indicators as desired. Also, the inclusion of vehicle images, such as vehicles A, B, and C shown in FIG. 6A, may aid a technician in accurately placing or adjusting handoff segment indicators. In an embodiment, the configuration utility may be configured to determine a distance between handoff border indicators 651a and 652a, an alert a user of the GUI if this distance is below a minimum desired distance.

Although the GUI illustrated in FIGS. 6A and 6B shows and describes indicators provided by the GUI as simple lines, the configuration utility and the GUI may also provide for specifying features with more complex shapes, such as, but not limited to, curves and freehand lines. Also, where an indicator specified in connection with a first camera, such as lane/path boundary indicator 623a, has a counterpart indicator in connection with another camera, such as lane/path boundary indicator 623*b*, these counterpart indicators may be linked using the GUI. In an embodiment, such links may be automatically determined or suggested based on information such as previously specified indicators, a known position of a camera, a known orientation of the camera, and known aspects of traffic flow proximate to a camera, such as numbers of lanes/paths and directions of traffic flow within those lanes/paths.

In an embodiment, where a camera provides for zoom and/or pan/tilt capabilities, the configuration utility may be configured to allow for the specification of various indicator features in images captured with the camera at various zoom levels or orientations. This additional information may be used to more fully specify the overall field of view of the camera. Once a technician is satisfied with how indicators and/or rulers have been used to specify the field of view of a camera, this information and/or other information derived therefrom may be stored in database 141 for use in, for example, vehicle tracking by server system 140.

The configuration utility may be configured to provide a GUI to perform contiguous video camera alignment. This functionality may be provided via additional user interface elements included in the above-described GUI for specifying lane/path boundaries. Contiguous video camera alignment refers to the fact that during an initial camera hardware installation process, or if existing camera hardware is later updated, if the camera is equipped with pan, tilt, and/or zoom (PTZ) function, the pan, tilt, and/or zoom settings of the camera need to be adjusted and/or calibrated to ensure there is sufficient overlap in the field of vision between cameras, such as the overlap illustrated in FIGS. 4, 6A, and 6B. A technician can review the GUI to determine whether a handoff zone of sufficient size and/or duration is provided by a pair of cameras. If not, pan, tilt, and/or zoom settings may require changes, or the physical installation location of a camera may need to be changed altogether.

The configuration utility may be configured to provide a GUI to perform pre-mapping of destination locations, such as parking spaces and "no parking" zones. The GUI presents an image feed and allows a technician to superimpose grayed out polygons, for example, on an image feed. In another nonlimiting example, a parking spot #123 might be mapped to a collection of 20 pixels as captured by a particular destination camera at a given zoom level and/or PTZ orientation. The GUI may be configured to provide operations for including, but not limited to, moving, resizing, and rotating such polygons to indicate the position and extent of destination locations within a field of view of a camera. Where a camera has PTZ capabilities, PTZ controls may be provided. This functionality may be provided via additional user interface elements included in the above-described GUI for specifying lane/path boundaries. The GUI may also provide an interface of assigning an identifier to a destination location which may be used, for example, to provide a common identifier for the destination location for use by various aspects of server system 140. The GUI may also provide interface elements allowing for various characteristics of a destination location to be specified, although it may be preferable to employ other aspects of the configuration utility or server system 140 to manage, assign, and/or modify such characteristics with minimal direct human operation.

In an embodiment, the configuration utility may be configured to provide a GUI to perform pre-mapping of multi-vehicle destination locations, discussed above, in much the same manner as the above description for pre-mapping single-vehicle destination locations. The configuration utility may be configured to allow multiple destination locations or multi-vehicle destination locations to be aggregated into a single destination location. For example, each of the constituent destination locations might be assigned a common identifier to indicate they form a multi-vehicle destination location. The configuration utility may be configured to allow restricted destination locations to be overlaid a multi-vehicle destination location, to "carve" out portions of a broad area subject to parking restrictions, such as, but not limited to, loading zones and driveways.

The configuration utility may be configured to provide a GUI for specifying what constitutes a parking violation. In a first example, a grace period duration may be specified with the GUI, which defines an amount of time a vehicle may occupy a destination location before the vehicle may be considered to be in violation of restrictions on use of the destination location. For example, when a vehicle stops at a parking meter, it is reasonable to provide a grace period sufficient for the driver of the vehicle to leave the vehicle and pay for parking. Differing periods of time may be specified for different types or groups of destination locations (for example, a "no parking" zone may have a small or zero grace period. In a second example, an amount of vehicle overlap may be specified with the GUI, as to how much in terms of square footage or percent area coverage a vehicle overlaps a destination location before the vehicle may be considered to be in violation. In a third example, permit parking rules may be specified with the GUI, including rules in connection with, for example, the use of handicap parking spaces, resident-only parking, or other parking requiring the display of a permit or decal. The GUI may also provide an interface for identifying characteristics and features of a required permit or decal, such as, but not limited to, color, an image featured on the permit or decal, and a location of an identifier (such as a serial number) for the permit or decal. In a fourth example, a GUI may be configured to define rules for determining what constitutes an expired license plate tag, such as whether a tag indicating the current month is considered to have expired.

The configuration utility may be configured to provide a GUI for specifying consequences for vehicle misuse of a destination location. Examples include, but are not limited to, on-screen display of license plate information, license plate lookup to obtain the name and address of a registered owner, dispatching an enforcement officer, provide a laser-based illumination of a vehicle misusing a destination location, applying a parking fine to a credit card or account on file, and deducting a parking fine from a checking or other monetary account.

The configuration utility may be configured to receive and record parameters specifying certain vehicles for which outcomes of detected parking violations would be modified (for example, a police vehicle may be identified as exempt from specified violations). For example, such vehicles may be identified by license plate number, or bear a specified identifier such as a decal.

In an embodiment, server system 140 may be configured to obtain preexisting street and/or parking information, which may be obtained through a commercial or municipal database and/or provided by a parking operator, and automatically determining destination and traffic lane/path information In an embodiment, based on information indicating the location and orientation of the various identification and destination cameras, server system 140 may be configured to automatically pre-map destination locations and/or traffic lanes/paths. In an embodiment, server system 140 may be configured to record and/or update characteristics for destination locations and or traffic lanes/paths recorded in database 141, such as, but not limited to, identifiers, locations (for example, latitude/longitude or street address), rates for use of destination locations, and time-based, date-based, and other restrictions for destination locations described in this application. In an embodiment, server system 140 may provide an API to more easily allow a parking provider to upload destination location information and/or updates in bulk.

In an alternative embodiment, server system 140 and other elements illustrated in FIG. 1 are in the form of a turnkey platform where no integration with third-party parking payment systems via an API is required. In such an embodiment, part of the turnkey platform consists of payment stations/equipment, and equipment that generates parking violation tickets for mailing.

In an embodiment, onsite payment system 160 may include a turnkey platform Pay-by-Phone feature. The end result is that end users can pay for parking by calling a particular IVR (interactive voice response) system-driven phone line and input a destination location identifier or vehicle license plate number and a duration of parking, regardless of whether a destination location is associated with a curbside parking meter, a Pay-by-Space parking space, or a parking lot.

The turnkey Pay-by-Phone module enables end users to pay for parking by use of a telephone—typically cellular phone. The turnkey Pay-by-Phone machine enables database-level integration with server system 140. Database-level integration is superior to API-level integration since database-level integration offers more flexibility and speed.

The turnkey Pay-by-Phone module receives data from one or more DTMF transceivers where users enter information over the telephone. There is no requirement for the turnkey Pay-by-Phone module to receive data from server system 140 in order for the turnkey Pay-by-Phone module to operate correctly. The turnkey Pay-by-Phone module may be configured to output data to mobile device 150 for manual paid parking validation, as well as to server system 140 for self-enforcement. All self-enforcement data processing takes place on server system 140.

In an embodiment, onsite payment system 160 may include Pay-Online on a turnkey platform. The end result is that end users can pay for parking or view prior history by visiting a website and enter a destination location identifier or vehicle license plate number and the duration of parking regardless of whether a destination location is associated with a curbside parking meter, a Pay-by-Space parking space, or a parking lot. This extends to other online conduits such as smart phones and, in the future, Internet-enabled media centers in cars.

The turnkey Pay-Online module receives data online where end users enter information over the Internet. There is no requirement for the turnkey Pay-Online module to receive data from server system 140 in order for the turnkey Pay-Online module to operate correctly. The turnkey Pay-Online module outputs data to the mobile device 150 for manual paid parking validation, as well as to the server system 140 for self-enforcement. All self-enforcement data processing takes place on server system 140.

In an embodiment, onsite payment system 160 may include a Pay-and-Display machine with QR codes. QR codes have become popular, and accordingly have significant smartphone support. Further, QR codes can easily hold all of the relevant information typically contained on a Pay-and-Display ticket (such as, but not limited to, parking duration, parking expiration time, amount paid, date, and time). The turnkey Pay-and-Display machine allows end users to pay for parking and leave a display ticket with a QR code on the dash of the vehicle. The turnkey Pay-and-Display machine enables database-level integration with server system 140. Database-level integration is superior to API-level integration since database-level integration offers more flexibility and speed.

The turnkey Pay-and-Display machine receives payment from end users via a built-in keypad, coin acceptor, credit card reader, and printer. There is also a text/graphics LCD display. There is no requirement for the turnkey Pay-and-Display machine to receive data from server system 140 in order for the turnkey Pay-and-Display machine to operate correctly. The turnkey Pay-and-Display machine outputs data to mobile device 150 for manual paid parking validation, as well as to server system 140 for self-enforcement. All self-enforcement data processing takes place on server system 140.

In an embodiment, onsite payment system 160 may include a Pay-by-Space turnkey machine. Pay-by-Space is increasingly becoming popular compared to Pay-and-Display which has a longer history of operation. Parking operations using Pay-by-Space are generally more efficient since parking enforcement personnel no longer have to walk to each vehicle and lean into the windshield in order to manually check the printed expiration time. Instead, they can drive in a patrol vehicle and perform visual checks from a distance to see whether an occupied parking space has been paid for. In addition, Pay-by-Space offers enhanced user experience since drivers no longer have to walk back to their vehicles to display the ticket after paying at the machine—instead, they can continue on to their destination.

The turnkey Pay-by-Space machine receives payment from end users via a built-in keypad, coin acceptor, credit card reader, and printer. There is also a text/graphics LCD display. There is no requirement for the turnkey Pay-by-Space machine to receive data from server system 140 in order for the turnkey Pay-by-Space machine to operate correctly. The turnkey Pay-by-Space machine may output data to the mobile device 150 for manual paid parking validation, as well as to server system 140 for self-enforcement. All self-enforcement data processing takes place on server system 140.

In an embodiment, onsite payment system 160 may include a Pay-by-Plate turnkey machine. The turnkey Pay-by-Plate machine receives payment from end users via a built-in keypad, coin acceptor, credit card reader, and printer. There is also a text/graphics LCD display. There is no requirement for the turnkey Pay-by-Plate machine to receive data from server system 140 in order for the turnkey Pay-by-Plate machine to operate correctly. The turnkey Pay-by-Plate machine may output data to the mobile device 150 for manual paid parking validation, as well as to server system 140 for self-enforcement. All self-enforcement data processing takes place on server system 140.

Integration with third-party parking systems is an option rather than a requirement for server system 140. In a turnkey configuration where the entire parking equipment platform is provided, for example, through a single supplier, no integration with third party parking systems is required. However, there are many advantages to the integration approach using API. An API provides a standard software programming interface designed to allow an external program to gain access to information in a host system without exposing any trade secrets of the host system. This is achieved by creating clearly defined functions, objects, and variables at the boundary of the two systems, such that the external system is allowed to obtain pre-defined set of information without any knowledge of how the information is gathered, stored, or calculated within the host system itself. As such, companies generally have no reservations with publishing API for other systems to interface to its products or servers. Data may be exchanged via an API via network-based mechanisms, often protected by encryption mechanisms such as SSL, relying on XML, JSON, HTML, MIME, or other encodings or languages supported by the API.

There are two ways for server system 140 to integrate with an API. First, by using an API published by the third-party parking system, server system 140 can gain access to vehicle payment information (such as, but not limited to, duration paid, and space number). Combined with the vehicle detection and vehicle identity information server system 140 already possesses, server system 140 has or can readily obtain the complete information necessary to produce a list of vehicle license plates with detailed parking violation information to a parking facility operator. The parking facility operator can then follow its SOP, and mail parking violation tickets, install wheel clamps, or tow repeat or severe offenders.

The second integration method is for server system 140 to publish its own API so third-party parking systems can obtain information on vehicle detection and vehicle identity. Combined with the vehicle payment information already possessed by the third-party parking system, the third-party parking system can then provide a seamless presentation to the parking operator including a list of vehicle license plates with detailed parking violation information. The third-party parking system provider may prefer this approach in order to retain control over how the parking violation information flows back to the parking operator.

By use of APIs, server system 140 can integrate with the following types of parking payment systems: Pay-by-Phone, Pay-by-Space, Pay-and-Display, Curbside Parking Meters (single or double space), and Live-Operator Option.

The basic premise of Pay-by-Phone is an end user (such as a driver of a vehicle) calls a phone number displayed in the vicinity of a destination location. Typically the phone number offers IVR (interactive voice response) which guides callers through an automated menu. The end user is prompted to input a unique destination location number, followed by parking duration desired, vehicle license plate number, and credit card information.

Pay-by-Phone is starting to gain traction as a popular "overlay" payment approach, where parking facility operators add Pay-by-Phone capability to curbside parking meters, Pay-by-Space, and Pay-and-Display machines. The typical motivation is to provide end users an alternate way of paying for parking in an effort to increase parking revenue. For example, Pay-by-Phone may be added to traditional curbside parking meters (single or double space) in order to allow end users to pay with credit cards over the phone.

In an embodiment, server system 140 may include a Pay-by-Phone integration module, which may be a software component that extracts parking payment information from a third party parking payment system which server system 140 uses for parking self-enforcement. The integration module for pay-by-phone performs steps including: (1) establishing a connection with a third-party Pay-by-Phone API; (2) issuing a request for data; (3) receiving data; (4) processing and storing data to database 141; (5) determining parking violation status; (6) marking use of a destination location as a parking violation in database 141 for further processing, for example, by the below-described parking violation pre-processing logic; (7) periodic confirmation that the third-party Pay-by-Phone API is active and valid, such as, but not limited to, by use of "keep-alive"/"ping" messages or commands; and (8) repeating steps 2-7 or closing the connection. In connection with step (1), an API typically specifies the mechanism through which a connection to it can be established. The Pay-by-Phone integration module is configured to observe the protocol required by the third-party Pay-by-Phone API and establishes a connection.

In connection with step (2), when server system 140 determines that a particular vehicle has vacated a destination location, server system 140 signals this event to the Pay-by-Phone integration module, such as via a database or Inter-Process Communication (IPC) call, in response to which the Pay-by-Phone integration module issues a request to the third-party Pay-by-Phone API for parking payment information for the particular vehicle. Data sent to the third-party Pay-by-Phone API may include, for example, vehicle license plate information (including plate number and state/province information), an identifier for the destination location recognized by the Pay-by-Phone API (which may require translation from an identifier used internally by server system 140), and a date/time the particular vehicle vacated the destination location.

In connection with step (3), the Pay-by-Phone integration module may be configured to receive information from the third-party Pay-by-Phone API including, for example, a paid parking start date/time and a paid parking end date/time. In connection with step (5), the Pay-by-Phone integration module may be configured to compare a duration of paid parking indicated by the data received from step (3) with the actual parking duration determined by server system 140. If the actual parking duration exceeds the paid parking duration, processing of step (6) is performed, otherwise step (6) is not performed.

In an embodiment in which an API provided by server system 140 is used for integration, the Pay-by-Phone system will obtain only the vehicle detection information (actual vehicle parking start and end times) from server system 140 since typically vehicle license plate information is already possessed by the Pay-by-Phone system. The end result is the Pay-by-Phone system will have the precise information required to generate a list of vehicle license plates with parking violation details.

Typically when a Pay-by-Phone system or its staff is agreeable to using the API provided by server system 140, the Pay-by-Phone system or its staff is prepared to undertake some degree of custom software development generally for the purpose of receiving some useful data from server system 140. In this particular case, the useful data is actual vehicle parking duration, indicating an actual amount of time a particular vehicle has occupied a specific destination location, for a particular vehicle license plate number or destination location number. In general, Pay-by-Phone systems already have the vehicle license plate number or destination location number, as they are generally obtained as part of the end user payment process.

Integration via a Pay-by-Phone API provided by server system 140 may be according to one of two options. First is a data inflow model, in which the third party parking payment system pushes information into server system 140. Second is a data outflow model, in which server system 140 pushes all relevant information to the Pay-by-Phone system.

In an embodiment, server system 140 may include an inflow-based Pay-by-Phone API for use by a third-party parking payment system via, for example, network 110, in which the third party parking payment system pushes information into server system 140 via the inflow-based Pay-by-Phone API. The inflow-based Pay-by-Phone API may be configured to perform steps including, for example: (1) waiting for the third party parking payment system to establish a connection; (2) authenticating the identity of the third party parking payment system; (3) receiving data from the third party parking payment system; (4) processing and storing data to database 141; (5) determining parking violation status; (6) marking use of a destination location as a parking violation in database 141 for further processing, for example, by the below-described parking violation pre-processing logic; (7) periodic confirmation that the inflow-based Pay-by-Phone API is active and valid, such as, but not limited to, by use of "keep-alive"/"ping" messages or commands; and (8) closing the connection when requested or upon timeout. In connection with step (1), this may involve listening on a TCP or UDP port for the third party parking payment system to establish the connection. In connection with step (2), the third party parking payment system is required to authenticate itself through the inflow-based Pay-by-Phone API before data exchange is permitted. If authentication fails, a retry mechanism may be provided, and after several unsuccessful attempts the connection may be dropped. In connection with step (3), server system 140 may be configured to, via the inflow-based Pay-by-Phone API, receive vehicle parking information from the third party parking payment system every time a vehicle/driver pays for parking. The received information for a particular vehicle may include, for example, vehicle license plate information (including plate number and state/province information), an identifier for a destination location for which payment was received in connection with the particular vehicle (which may require translation to an identifier used internally by server system 140), a paid parking start date/time, and paid parking end date/time. In connection with step (5), a Pay-by-Phone integration module included in server system 140 may be configured to compare a duration of paid parking indicated by the data received from step (3) with the actual parking duration determined by server system 140. If the actual parking duration exceeds the paid parking duration, processing of step (6) is performed, otherwise step (6) is not performed.

In an embodiment, server system 140 may include an outflow-based Pay-by-Phone API for use by a third-party parking payment system via, for example, network 110, in which server system 140 pushes all relevant information to the third-party Pay-by-Phone system. The outflow-based Pay-by-Phone API may be configured to perform steps including, for example: (1) waiting for the third party parking payment system to establish a connection; (2) authenticating the identity of the third party parking payment system; (3) uploading data to the third party parking payment system; (4) receiving an acknowledgement for the uploaded data; (5) responding to "keep-alive"/"ping" requests from the third party parking payment system; and (6) closing the connection when requested or upon timeout. In connection with step (1), this may involve listening on a TCP or UDP port for the third party parking payment system to establish the connection. In connection with step (2), the third party parking payment system is required to authenticate itself through the outflow-based Pay-by-Phone API before data exchange is permitted. If authentication fails, a retry mechanism may be provided, and after several unsuccessful attempts the connection may be dropped. In connection with step (3), server system 140 may be configured to, via the outflow-based Pay-by-Phone API, upload vehicle parking information to the third party parking payment system every time a vehicle vacates a destination location associated with the third party parking payment system. The uploaded information for a particular vehicle may include, for example, vehicle license plate information (including plate number and state/province information), an identifier for the destination location recognized by the third party parking payment system (which may require translation from an identifier used internally by server system 140), an actual date/time the particular vehicle began use of the destination location, and an actual date/time the particular vehicle vacated the destination location.

In another embodiment, integration between a Pay-by-Phone system and server system 140 takes place in two steps. First, server system 140 obtains vehicle payment information from the Pay-by-Phone system (such as paid parking start and end times, parking space number, vehicle license plate number) by using the Pay-by-Phone system-provided API. At this stage, the server system 140 will have the precise information required to generate a list of vehicle license plates with parking violation details. However, instead of server system 140 presenting this list to a parking operator, there may be instances where an incumbent parking payment vendor wishes to retain control over how the parking violation information flows back to the parking operator. This can be accomplished by sending the vehicle violation data back to the Pay-by-Phone system by using the API provided by server system 140. The Pay-by-Phone system will then have total control over how the list of "offending" vehicles is presented to the parking operator (for example, by way of a custom software application developed by the Pay-by-Phone system vendor).

A significant difference between this integration method and only relying on integration via the API provided by server system 140 is that this integration method requires minimal development effort on the part of the Pay-by-Phone system vendor. Since all the key information to be presented to the parking operator is already supplied by the API provided by server system 140 without any further analysis required, this information can simply be displayed or forwarded to the parking operator with minimal software development. This integration approach represents a "pull" followed by a "push" model.

The premise of Pay-by-Space is that once an end user parks a vehicle, the end user notes the space number of the parking spot. When the end user pays for parking at a Pay-by-Space machine, the end user enters a stall number followed by parking duration desired. Once the payment is complete, the end user does not need to leave a ticket in the vehicle, instead the end user can simply continue on to wherever they are going. Pay-by-Space works equally well for both on-street curbside parking and off-street parking lots/parking garages.

Pay-by-Space is increasingly becoming popular compared to Pay-and-Display, which has a longer history of operation. Parking operations using Pay-by-Space are generally more efficient since parking enforcement personnel no longer have to walk to each vehicle and lean into the windshield in order to manually check a printed expiration time. Instead, they can drive in a patrol vehicle and perform visual checks from a distance to see whether an occupied parking space has been paid for. In addition, Pay-by-Space offers enhanced an user experience since end users no longer have to walk back to their vehicles to display the ticket after paying at the machine—instead, they can continue on to their destination.

Similar to the above-described Pay-by-Phone, integration can be accomplished by using either a Pay-by-Space system-provided API or an API provided by server system 140. The objective is for either system to gain access to all the information required to generate a list of vehicle license plates with parking violation information.

In an embodiment in which server system 140 is integrated via a Pay-by-Space system-provided API, server system 140 obtains vehicle payment information from the Pay-by-Space system (such as paid parking start and end times, destination location number, and vehicle license plate number). The end result is server system 140 will have the precise information required to generate a list of vehicle license plates with parking violation details.

In an embodiment, server system 140 may include a Pay-by-Space integration module, which may be a software component that extracts parking payment information from a third party parking payment system which server system 140 uses for parking self-enforcement. The integration module for pay-by-space performs steps including: (1) establishing a connection with a third-party Pay-by-Space API; (2) issuing a request for data; (3) receiving data; (4) processing and storing data to database 141; (5) determining parking violation status; (6) marking use of a destination location as a parking violation in database 141 for further processing, for example, by the below-described parking violation pre-processing logic; (7) periodic confirmation that the third-party Pay-by-Space API is active and valid, such as, but not limited to, by use of "keep-alive"/"ping" messages or commands; and (8) repeating steps 2-7 or closing the connection. In connection with step (1), an API typically specifies the mechanism through which a connection to it can be established. The Pay-by-Space integration module is configured to observe the protocol required by the third-party Pay-by-Space API and establishes a connection.

In connection with step (2), when server system 140 determines that a particular vehicle has vacated a destination location, server system 140 signals this event to the Pay-by-Space integration module, such as via a database or Inter-Process Communication (IPC) call, in response to which the Pay-by-Space integration module issues a request to the third-party Pay-by-Space API for parking payment information for the particular vehicle. Data sent to the third-party Pay-by-Space API may include, for example, an identifier for the destination location recognized by the Pay-by-Space API (which may require translation from an identifier used internally by server system 140), and a date/time the particular vehicle vacated the destination location.

In connection with step (3), the Pay-by-Space integration module may be configured to receive information from the third-party Pay-by-Space API including, for example, a paid parking start date/time and a paid parking end date/time. In connection with step (5), the Pay-by-Space integration module may be configured to compare a duration of paid parking indicated by the data received from step (3) with the actual parking duration determined by server system 140. If the actual parking duration exceeds the paid parking duration, processing of step (6) is performed, otherwise step (6) is not performed.

In an embodiment in which server system 140 is integrated with a Pay-by-Space system via an API provided by server system 140, server system 140 transmits vehicle information to the Pay-by-Space system (such as vehicle license plate number, destination location, and actual parking start and end times). The end result is the Pay-by-Space system will have the precise information required to generate a list of vehicle license plates with parking violation details.

Typically when a Pay-by-Space system or its staff is agreeable to using the API provided by server system 140, the Pay-by-Space system or its staff is prepared to undertake some degree of custom software development generally for the purpose of receiving some useful data from server system 140. In this particular case, the useful data is actual vehicle parking duration, an actual amount of time a particular vehicle has occupied a specific destination location, for a particular vehicle license plate number or space number. In general, Pay-by-Space systems already have the vehicle license plate number or space number, as this may be obtained as part of the end user payment process.

Integration via a Pay-by-Space API provided by server system 140 may be according to one of two options. First is a data inflow model, in which the third party parking payment system pushes information into server system 140. Second is a data outflow model, in which server system 140 pushes all relevant information to the third-party Pay-by-Space system.

In an embodiment, server system 140 may include an inflow-based Pay-by-Space API for use by a third-party parking payment system via, for example, network 110, in which the third party parking payment system pushes information into server system 140 via the inflow-based Pay-by-Space API. The inflow-based Pay-by-Space API may be configured to perform steps including, for example: (1) waiting for the third party parking payment system to establish a connection; (2) authenticating the identity of the third party parking payment system; (3) receiving data from the third party parking payment system; (4) processing and storing data to database 141; (5) determining parking violation status; (6) marking use of a destination location as a parking violation in database 141 for further processing, for example, by the below-described parking violation pre-processing logic; (7) periodic confirmation that the inflow-based Pay-by-Space API is active and valid, such as, but not limited to, by use of "keep-alive"/"ping" messages or commands; and (8) closing the connection when requested or upon timeout. In connection with step (1), this may involve listening on a TCP or UDP port for the third party parking payment system to establish the connection. In connection with step (2), the third party parking payment system is required to authenticate itself through the inflow-based Pay-by-Space API before data exchange is permitted. If authentication fails, a retry mechanism may be provided, and after several unsuccessful attempts the connection may be dropped. In connection with step (3), server system 140 may be configured to, via the inflow-based Pay-by-Space API, receive vehicle parking information from the third party parking payment system every time a vehicle/driver pays for parking. The received information for a particular vehicle may include, for example, an identifier for a destination location for which payment was received in connection with the particular vehicle (which may require translation to an identifier used internally by server system 140), a paid parking start date/time, and paid parking end date/time. In connection with step (5), a Pay-by-Space integration module included in server system 140 may be configured to compare a duration of paid parking indicated by the data received from step (3) with the actual parking duration determined by server system 140. If the actual parking duration exceeds the paid parking duration, processing of step (6) is performed, otherwise step (6) is not performed.

In an embodiment, server system 140 may include an outflow-based Pay-by-Space API for use by a third-party parking payment system via, for example, network 110, in which server system 140 pushes all relevant information to the third-party Pay-by-Space system. The outflow-based Pay-by-Space API may be configured to perform steps including, for example: (1) waiting for the third party parking payment system to establish a connection; (2) authenticating the identity of the third party parking payment system; (3) uploading data to the third party parking payment system; (4) receiving an acknowledgement for the uploaded data; (5) responding to "keep-alive"/"ping" requests from the third party parking payment system; and (6) closing the connection when requested or upon timeout. In connection with step (1), this may involve listening on a TCP or UDP port for the third party parking payment system to establish the connection. In connection with step (2), the third party parking payment system is required to authenticate itself through the outflow-based Pay-by-Space API before data exchange is permitted. If authentication fails, a retry mechanism may be provided, and after several unsuccessful attempts the connection may be dropped. In connection with step (3), server system 140 may be configured to, via the outflow-based Pay-by-Space API, upload vehicle parking information to the third party parking payment system every time a vehicle vacates a destination location associated with the third party parking payment system. The uploaded information for a particular vehicle may include, for example, vehicle license plate information (including plate number and state/province information), an identifier for the destination location recognized by the third party parking payment system (which may require translation from an identifier used internally by server system 140), an actual date/time the particular vehicle began use of the destination location, and an actual date/time the particular vehicle vacated the destination location.

In another embodiment, server system 140 is configured to integrate with a Pay-by-Space system in two steps. First, server system 140 obtains vehicle payment information from the Pay-by-Space system (for example, paid parking start and end times, parking space number, vehicle license plate number) by using a Pay-by-Space system-provided API. At this stage, server system 140 will have the precise information required to generate a list of vehicle license plates with parking violation details. However, instead of server system 140 presenting this list to the parking operator, there may be instances where an incumbent parking payment vendor wishes to retain control over how the parking violation information flows back to the parking operator. This can be accomplished by sending the vehicle violation data back to the Pay-by-Space system by using the API provided by server system 140. The Pay-by-Space system will then have total control over how the list of "offending" vehicles is presented to the parking operator (such as by way of a custom software application developed by the Pay-by-Space system vendor).

A significant difference between this integration method and integration with the Pay-by-Space system via the API provided by server system 140 is that this integration method requires minimal development effort on the part of the Pay-by-Space system vendor. Since all the key information to be presented to the parking operator is already supplied by the API provided by server system 140 without any further analysis required, this information can simply be displayed or forwarded to the parking operator with minimal software development. This integration approach represents a "pull" followed by a "push" model.

The premise of a Pay-and-Display is that once an end user pays for parking, the end user needs to leave a ticket inside the vehicle on the dashboard in order for parking enforcement personnel to perform visual checks of the ticket to ensure that the period of time paid for by the end user has not expired.

Historically Pay-and-Display dominated off-street parking lots and parking garages. Despite the recent popularity of Pay-by-Space machines, Pay-and-Display still has a vast installed base. There are also Pay-and-Display systems deployed for curbside parking.

In order to provide self-enforcement capability, server system 140 requires the following information: vehicle license plate information (including state/province), actual parking start and end times, paid parking duration.

In an embodiment integrating server system 140 with a Pay-and-Display system, server system 140 gathers vehicle license plate information via the identification cameras, while the destination cameras provide actual parking start and end times by allowing server system 140 to determine when a vehicle pulls into a destination location and when the vehicle leaves. Paid parking duration may be determined by utilizing destination cameras with pan, tilt, and zoom capability, and zooming in to extract a bar code or printed characters from the display ticket itself which an end user places on a vehicle dashboard.

In an embodiment, to facilitate the reading of such information, a Pay-and-Display machine may be configured to use a larger font for the printed characters or print larger versions of other identifying features. In another embodiment, a Pay-and-Display machine may be configured to ask for a license plate number as part of a payment process, whereas a conventional system would only ask for an amount of time a driver wishes to park a vehicle. In an embodiment, a Pay-and-Display machine may utilize rolls of display ticket paper with an RFID chip embedded within each display ticket.

In an embodiment, server system 140 may be configured to perform pedestrian tracking based on multiple images captured via one or more cameras, such as a camera including a Pay-and-Display machine within its field of view. With pedestrian tracking, server system 140 may be configured to track a driver and/or passenger of a vehicle as they walk to and/or from a vehicle for which payment is obtained via the Pay-and-Display machine, much as server system 140 performs vehicle tracking. Based on the tracked pedestrian movement, the payment may be linked to a particular location for a vehicle, and a corresponding vehicle identifier, such as a license plate number, determined by server system 140. Such an embodiment eliminates a need to capture information directly from a printed ticket. In an example, server system 140 may receive a plurality of pedestrian images captured by one or more cameras, including one or more images demonstrating an individual was a passenger of the vehicle, and one or more images demonstrating the passenger made a payment at a Pay-and-Display payment station for use of a destination location. Server system 140 may be configured to perform tracking by determining whether characteristics determined for pedestrians captured in the pedestrian images correspond over time, demonstrating that the passenger traveled between the vehicle and the payment station, and made the payment. Based on this, server system 140 may associate the payment with use of a particular destination location by the vehicle.

With the above information available, server system 140 is able to produce a list of vehicle license plates with detailed violation information. This holds true regardless of whether the Pay-and-Display system supports real-time wireless networking since the Pay-and-Display system itself does not possess any of the said information.

In an embodiment integrating server system 140 with a Pay-and-Display system via an API provided by server system 140, to provide self-enforcement capability, server system 140 requires vehicle license plate information (including state/province information), actual parking start and end times, and paid parking duration.

Server system 140 gathers vehicle license plate information via the identification cameras, while the destination cameras allow server system 140 to determine actual parking start and end times by detecting when a vehicle pulls into a parking space and when it leaves. Paid parking duration is determined by using destination cameras with pan, tilt, and zoom functionality, enabling zooming in to extracting the bar code or printed characters from the display ticket itself which end users place on the vehicle dash.

The Pay-and-Display API provided by server system 140 may be configured to perform steps including, for example: (1) waiting for the third party parking payment system to establish a connection; (2) authenticating the identity of the third party parking payment system; (3) uploading data to the third party parking payment system; (4) receiving an acknowledgement for the uploaded data; (5) responding to "keep-alive"/"ping" requests from the third party parking payment system; and (6) closing the connection when requested or upon timeout. In connection with step (1), this may involve listening on a TCP or UDP port for the third party parking payment system to establish the connection. In connection with step (2), the third party parking payment system is required to authenticate itself through the Pay-and-Display API before data exchange is permitted. If authentication fails, a retry mechanism may be provided, and after several unsuccessful attempts the connection may be dropped. In connection with step (3), server system 140 may be configured to, via the Pay-and-Display API, upload vehicle parking information to the third party parking payment system every time a vehicle vacates a destination location associated with the third party parking payment system. The uploaded information for a particular vehicle may include, for example, vehicle license plate information (including plate number and state/province information), an identifier for the destination location recognized by the third party parking payment system (which may require translation from an identifier used internally by server system 140), an actual date/time the particular vehicle began use of the destination location, and an actual date/time the particular vehicle vacated the destination location.

When server system 140 is configured to operate in this mode, server system 140 transmits vehicle parking violation information to the Pay-and-Display system (such as vehicle license plate number, paid parking start and end times, actual parking start and end times). The end result is the third-party Pay-and-Display system will have the precise information required to generate a list of vehicle license plates with parking violation details.

Typically when a Pay-and-Display system or its staff is agreeable to using the API provided by server system 140, the Pay-and-Display system or its staff is prepared to undertake some degree of custom software development generally for the purpose of receiving some useful data from server system 140. In this particular case, the useful data is the paid parking start and end times, and actual vehicle parking start and end times for a particular vehicle license plate number. In general, Pay-and-Display systems are paper-based (as they rely on a printed display ticket) and do not possess any information with respect to vehicle identity or destination location number. While Pay-and-Display systems do possess paid parking start time and paid parking duration, these systems have no knowledge of which vehicle the paid parking correlates to. The Pay-and-Display system has the option of presenting a list of vehicles with parking violation information to the parking operator by using an API provided by server system 140. Through the API, the Pay-and-Display system can obtain the pertinent information from server system 140 and present it in any desired format.

As such, integration via the API provided by server system 140 is a "push" model where server system 140 "pushes" all relevant information to the Pay-and-Display system. Subsequently, the Pay-and-Display system displays a list of vehicle license plates with unpaid or expired parking. In other words, Pay-and-Display integration via the API provided by server system 140 is generally not accomplished in a "pull" model.

In an embodiment, a Pay-and-Display machine with QR codes may be provided. QR codes have become popular, and can easily hold all of the relevant information typically contained on a Pay-and-Display ticket (such as parking duration, parking expiration time, amount paid, date, and time).

In an embodiment, a Pay-by-Phone system may overlay a Pay-and-Display parking system, and server system 140 may be integrated with the Pay-by-Phone payment system via API. In such a case, where a Pay-by-Phone system-provided API is used, server system 140 will transmit vehicle detection information to the Pay-by-Phone system since typically the vehicle license plate information is already possessed by the Pay-by-Phone system. The end result is the Pay-by-Phone system will have the information required to generate a list of vehicle license plates with parking violation details.

While traditional curbside parking meters (single or double space) would only accept coins with no built-in intelligence or networking capability, Pay-by-Phone has become a popular "overlay" payment approach which works well with traditional curbside parking meters. Recently there has also been an emergence of curbside parking meters which accept both coins and credit cards, and have networking capability built-in.

Traditional parking meters generally have either a mechanical or an LCD display "expired flag" to indicate that a paid parking period has expired or parking is simply not paid. When parking has been paid and there is time remaining, the mechanical expired flag (typically red) is hidden from view, whereas the LCD display shows a clear display on the side of the meter facing the roadway. In contrast, when paid parking has expired or when no payment has been made, the red mechanical expired flag is prominently displayed in the "up" position, while the LCD display facing the roadway flashes alternately between a clear display and a dark display (sometimes also with a flashing red LED). Both of these are generally referred to as an expired flag.

In an embodiment, server system 140 can interface with traditional curbside parking meters using a combination of information gathered from both identification and destination cameras. In addition to identifying vehicle parking status (such as, but not limited to, parking start and end times), images captured by the identification and destination cameras can pinpoint paid parking status (such as, but not limited to, whether a prepaid time has expired) on the parking meters.

Server system 140 gathers vehicle license plate information via the images captured by identification cameras, while images captured by destination cameras enable server system 140 to determine actual parking start and end times by detecting when a vehicle pulls into a parking space and when it leaves. Time of expiration of paid parking is determined by zooming in with both location and destination cameras and monitoring the visible status of the expiration flag on each parking meter. Based on this information, server system 140 may determine parking violation status, and mark use of a destination location as a parking violation in database 141 for further processing, for example, by the below-described parking violation pre-processing logic. In situations where an expiration flag is not readable by server system 140, server system 140 may be configured to indicate an exception to a parking operator or staff and/or make use of a Live Operator (discussed below) to manually determine parking violation status and/or exception flag status.

A destination image captured by a destination camera from across the street will have sufficient angle of view to monitor the status of the expiration flag on each parking meter. Additionally, an identification camera with pan, tilt, and zoom capability can be provided with sufficient zoom power and angle of view to also monitor the expiration flag status on each parking meter. With the above information available, server system 140 is able to produce a list of vehicle license plates with detailed violation information.

In an embodiment integrating server system 140 with a Traditional Curbside Parking Meter system via an API provided by server system 140, to provide self-enforcement capability, server system 140 requires vehicle license plate information (including state/province information), actual parking start and end times, and paid parking duration.

Server system 140 gathers vehicle license plate information via the images captured by identification cameras, while images captured by destination cameras enable server system 140 to determine actual parking start and end times by detecting when a vehicle pulls into a parking space and when it leaves. Time of expiration of paid parking is determined by zooming in with both location and destination cameras and monitoring the visible status of the expiration flag on each parking meter. Based on this information, server system 140 may determine parking violation status, and mark use of a destination location as a parking violation in database 141 for further processing, for example, by the below-described parking violation pre-processing logic. In situations where an expiration flag is not readable by server system 140, server system 140 may be configured to indicate an exception to a parking operator or staff and/or make use of a Live Operator (discussed below) to manually determine parking violation status and/or exception flag status.

The Traditional Curbside Parking Meter API provided by server system 140 may be configured to perform steps including, for example: (1) waiting for the third party parking payment system to establish a connection; (2) authenticating the identity of the third party parking payment system; (3) uploading data to the third party parking payment system; (4) receiving an acknowledgement for the uploaded data; (5) responding to "keep-alive"/"ping" requests from the third party parking payment system; and (6) closing the connection when requested or upon timeout. In connection with step (1), this may involve listening on a TCP or UDP port for the third party parking payment system to establish the connection. In connection with step (2), the third party parking payment system is required to authenticate itself through the Traditional Curbside Parking Meter API before data exchange is permitted. If authentication fails, a retry mechanism may be provided, and after several unsuccessful attempts the connection may be dropped. In connection with step (3), server system 140 may be configured to, via the Traditional Curbside Parking Meter API, upload vehicle parking information to the third party parking payment system every time a vehicle vacates a destination location associated with the third party parking payment system. The uploaded information for a particular vehicle may include, for example, vehicle license plate information (including plate number and state/province information), an identifier for the destination location recognized by the third party parking payment system (which may require translation from an identifier used internally by server system 140), an actual date/time the particular vehicle began use of the destination location, and an actual date/time the particular vehicle vacated the destination location.

When server system 140 is configured to operate in this mode, server system 140 transmits vehicle parking violation information to the Traditional Curbside Parking Meter system, which is typically a payment collection/tallying system with no connectivity to the actual curbside meters. The end result is that the Traditional Curbside Parking Meter system will have the precise information required to generate a list of vehicle license plates with parking violation details.

Typically when a Traditional Curbside Parking Meter system or its staff is agreeable to using the API provided by server system 140, the Traditional Curbside Parking Meter system or its staff is prepared to undertake some degree of custom software development generally for the purpose of receiving some useful data from server system 140. In this particular case, the useful data is the expired or unpaid parking status, and actual vehicle parking start and end times for a particular vehicle license plate number. In general, Traditional Curbside Parking Meter systems do not possess any information with respect to vehicle identity or space number.

As such, integration via the API provided by server system 140 is a "push" model where server system 140 "pushes" all relevant information to the Traditional Curbside Parking Meter system. Subsequently, the Traditional Curbside Parking Meter system displays a list of vehicle license plates with unpaid or expired parking.

In an embodiment, a Pay-by-Phone system may overlay a traditional curbside parking system, and server system 140 may be integrated with the Pay-by-Phone payment system via API. In such a case, where a Pay-by-Phone system-provided API is used, server system 140 will transmit vehicle detection information to the Pay-by-Phone system since typically the vehicle license plate information is already possessed by the Pay-by-Phone system. The end result is the Pay-by-Phone system will have the information required to generate a list of vehicle license plates with parking violation details.

More recently, curbside parking meters (single or double space) have been introduced which perform credit card authorization using a built-in 3G or WiFi modem. In an embodiment, server system 140 can be configured to interface with this type of parking meters through a Curbside Parking Meter API. Specifically, since these curbside parking meters already have built-in wireless network connectivity and an associated backend server, it is not difficult for server system 140 to integrate with this third-party backend server.

When server system 140 is configured to operate in this mode, an integration module for the Curbside Parking Meter API performs steps including: (1) establishing a connection with a third-party Curbside Parking Meter API; (2) issuing a request for data; (3) receiving data; (4) processing and storing data to database 141; (5) determining parking violation status; (6) marking use of a destination location as a parking violation in database 141 for further processing, for example, by the below-described parking violation pre-processing logic; (7) periodic confirmation that the Curbside Parking Meter API is active and valid, such as, but not limited to, by use of "keep-alive"/"ping" messages or commands; and (8) repeating steps 2-7 or closing the connection. In connection with step (1), an API typically specifies the mechanism through which a connection to it can be established. The integration module for the Curbside Parking Meter API is configured to observe the protocol required by the Curbside Parking Meter API and establishes a connection.

In connection with step (2), when server system 140 determines that a particular vehicle has vacated a destination location, server system 140 signals this event to the integration module for the Curbside Parking Meter API, such as via a database or Inter-Process Communication (IPC) call, in response to which the integration module for the Curbside Parking Meter API issues a request to the third-party Curbside Parking Meter API for parking payment information for the particular vehicle. Data sent to the third-party Curbside Parking Meter API may include, for example, an identifier for the destination location recognized by the Curbside Parking Meter API (which may require translation from an identifier used internally by server system 140), and a date/time the particular vehicle vacated the destination location.

In connection with step (3), the integration module for the Curbside Parking Meter API may be configured to receive information from the third-party Curbside Parking Meter API including, for example, an identifier for the destination location recognized by the Curbside Parking Meter API (which may require translation to an identifier used internally by server system 140), a paid parking start date/time, and a paid parking end date/time. In connection with step (5), the integration module for the Curbside Parking Meter API may be configured to compare a duration of paid parking indicated by the data received from step (3) with the actual parking duration determined by server system 140. If the actual parking duration exceeds the paid parking duration, processing of step (6) is performed, otherwise step (6) is not performed.

As such, integration via Curbside Parking Meter API is a "pull" model where server system 140 "pulls" all relevant information the third-party Curbside Parking Meter system is capable of outputting, and adds automated vehicle violation information determined by server system 140 to produce a list of vehicle license plates with unpaid or expired parking. In other words, integration via Curbside Parking Meter API is generally not accomplished in a "push" model.

In an embodiment in which server system 140 is configured to integrate with a Curbside Parking Meter system via an API provided by server system 140, server system 140 transmits vehicle information to the Curbside Parking Meter system (such as vehicle license plate number, destination location, and actual parking start and end times). The end result is the Curbside Parking Meter system will have the precise information required to generate a list of vehicle license plates with parking violation details.

Typically when a Curbside Parking Meter system or its staff is agreeable to using the API provided by server system 140, the Curbside Parking Meter system or its staff is prepared to undertake some degree of custom software development generally for the purpose of receiving some useful data from server system 140. In this particular case, the useful data is actual vehicle parking duration, the actual amount of time a particular vehicle has occupied a specific destination location, for a particular vehicle license plate number or destination location number. In general, Curbside Parking Meter systems already have the vehicle license plate number or space number, as this information may be obtained as part of the end user payment process.

Integration via a Curbside Parking Meter API provided by server system 140 may be according to one of two options. First is a data inflow model, in which the third party parking payment system pushes information into server system 140. Second is a data outflow model, in which server system 140 pushes all relevant information to the Curbside Parking Meter system.

In an embodiment, server system 140 may include an inflow-based Curbside Parking Meter API for use by a third-party parking payment system via, for example, network 110, in which the third party parking payment system pushes information into server system 140 via the inflow-based Curbside Parking Meter API. The inflow-based Curbside Parking Meter API may be configured to perform steps including, for example: (1) waiting for the third party parking payment system to establish a connection; (2) authenticating the identity of the third party parking payment system; (3) receiving data from the third party parking payment system; (4) processing and storing data to database 141; (5) determining parking violation status; (6) marking use of a destination location as a parking violation in database 141 for further processing, for example, by the below-described parking violation pre-processing logic; (7) periodic confirmation that the inflow-based Curbside Parking Meter API is active and valid, such as, but not limited to, by use of "keep-alive"/"ping" messages or commands; and (8) closing the connection when requested or upon timeout. In connection with step (1), this may involve listening on a TCP or UDP port for the third party parking payment system to establish the connection. In connection with step (2), the third party parking payment system is required to authenticate itself through the inflow-based Curbside Parking Meter API before data exchange is permitted. If authentication fails, a retry mechanism may be provided, and after several unsuccessful attempts the connection may be dropped. In connection with step (3), server system 140 may be configured to, via the inflow-based Curbside Parking Meter API, receive vehicle parking information from the third party parking payment system every time a vehicle/driver pays for parking. The received information for a particular vehicle may include, for example, an identifier for a destination location for which payment was received in connection with the particular vehicle (which may require translation to an identifier used internally by server system 140), a paid parking start date/time, and a paid parking end date/time. In connection with step (5), a Curbside Parking Meter integration module included in server system 140 may be configured to compare a duration of paid parking indicated by the data received from step (3) with the actual parking duration determined by server system 140. If the actual parking duration exceeds the paid parking duration, processing of step (6) is performed, otherwise step (6) is not performed.

In an embodiment, server system 140 may include an outflow-based Curbside Parking Meter API for use by a third-party parking payment system via, for example, network 110, in which server system 140 pushes all relevant information to the third-party Curbside Parking Meter system. The outflow-based Curbside Parking Meter API may be configured to perform steps including, for example: (1) waiting for the third party parking payment system to establish a connection; (2) authenticating the identity of the third party parking payment system; (3) uploading data to the third party parking payment system; (4) receiving an acknowledgement for the uploaded data; (5) responding to "keep-alive"/"ping" requests from the third party parking payment system; and (6) closing the connection when requested or upon timeout. In connection with step (1), this may involve listening on a TCP or UDP port for the third party parking payment system to establish the connection. In connection with step (2), the third party parking payment system is required to authenticate itself through the outflow-based Curbside Parking Meter API before data exchange is permitted. If authentication fails, a retry mechanism may be provided, and after several unsuccessful attempts the connection may be dropped. In connection with step (3), server system 140 may be configured to, via the outflow-based Curbside Parking Meter API, upload vehicle parking information to the third party parking payment system every time a vehicle vacates a destination location associated with the third party parking payment system. The uploaded information for a particular vehicle may include, for example, vehicle license plate information (including plate number and state/province information), an identifier for the destination location recognized by the third party parking payment system (which may require translation from an identifier used internally by server system 140), an actual date/time the particular vehicle began use of the destination location, and an actual date/time the particular vehicle vacated the destination location.

In an embodiment, server system 140 may be configured to integrate with a Curbside Parking Meter system in two steps. First, server system 140 obtains vehicle payment information from the Curbside Parking Meter system (such as paid parking start and end times, parking space number, vehicle license plate number) by using the Curbside Parking Meter system-provided API. At this stage, server system 140 will have the precise information required to generate a list of vehicle license plates with parking violation details. However, instead of server system 140 presenting this list to a parking operator, there may be instances where an incumbent parking payment vendor wishes to retain control over how the parking violation information flows back to the parking operator. This can be accomplished by sending the vehicle violation data back to the Curbside Parking Meter system by using an API provided by server system 140. The Curbside Parking Meter system will then have total control over how the list of "offending" vehicles is presented to the parking operator (such as by use of a custom software application developed by the Curbside Parking Meter system vendor).

A significant difference between this integration method and integration via the API provided by server system 140 is that this integration method requires minimal development effort on the part of the Curbside Parking Meter system vendor. Since all the key information to be presented to the parking operator is already supplied by the API provided by server system 140 without any further analysis required, this information can simply be displayed or forwarded to the parking operator with minimal software development. This integration approach represents a "pull" followed by a "push" model.

Similar to Pay-by-Space where a parking payment is associated with a particular numbered parking space (in which a vehicle parks), Pay-by-Plate associates a parking payment to a vehicle with a particular license plate parked in a parking space. Manual enforcement of Pay-by-Plate parking typically involves the enforcement officer driving past the physical parking space to ensure license plates of all parked vehicles are on a list of license plates with paid status. Conversely, any parked vehicles with license plates not on the "paid" list would receive a parking citation.

Similar to the above-described Pay-by-Phone and Pay-by-Space, integration can be accomplished by using either a Pay-by-Plate system-provided API or an API provided by server system 140. The objective is for either system to gain access to all the information required to generate a list of vehicle license plates with parking violation information.

In an embodiment in which server system 140 is integrated via a Pay-by-Plate system-provided API, server system 140 obtains vehicle payment information from the Pay-by-Plate system (such as paid parking start and end times and vehicle license plate numbers). The end result is server system 140 will have the precise information required to generate a list of vehicle license plates with parking violation details.

In an embodiment, server system 140 may include a Pay-by-Plate integration module, which may be a software component that extracts parking payment information from a third party parking payment system which server system 140 uses for parking self-enforcement. The integration module for pay-by-plate performs steps including: (1) establishing a connection with a third-party Pay-by-Plate API; (2) issuing a request for data; (3) receiving data; (4) processing and storing data to database 141; (5) determining parking violation status; (6) marking use of a destination location as a parking violation in database 141 for further processing, for example, by the below-described parking violation pre-processing logic; (7) periodic confirmation that the third-party Pay-by-Plate API is active and valid, such as, but not limited to, by use of "keep-alive"/"ping" messages or commands; and (8) repeating steps 2-7 or closing the connection. In connection with step (1), an API typically specifies the mechanism through which a connection to it can be established. The Pay-by-Plate integration module is configured to observe the protocol required by the third-party Pay-by-Plate API and establishes a connection.

In connection with step (2), when server system 140 determines that a particular vehicle has vacated a destination location, server system 140 signals this event to the Pay-by-Plate integration module, such as via a database or Inter-Process Communication (IPC) call, in response to which the Pay-by-Plate integration module issues a request to the third-party Pay-by-Plate API for parking payment information for the particular vehicle. Data sent to the third-party Pay-by-Plate API may include, for example, vehicle license plate information (including plate number and state/province information), and a date/time the particular vehicle vacated the destination location.

In connection with step (3), the Pay-by-Plate integration module may be configured to receive information from the third-party Pay-by-Plate API including, for example, a paid parking start date/time and a paid parking end date/time. In connection with step (5), the Pay-by-Plate integration module may be configured to compare a duration of paid parking indicated by the data received from step (3) with the actual parking duration determined by server system 140. If the actual parking duration exceeds the paid parking duration, processing of step (6) is performed, otherwise step (6) is not performed.

In an embodiment in which server system 140 is integrated with a Pay-by-Plate system via an API provided by server system 140, server system 140 transmits vehicle information to the Pay-by-Plate system (such as vehicle license plate number, destination location, and actual parking start and end times). The end result is the Pay-by-Plate system will have the precise information required to generate a list of vehicle license plates with parking violation details.

Typically when a Pay-by-Plate system or its staff is agreeable to using the API provided by server system 140, the Pay-by-Plate system or its staff is prepared to undertake some degree of custom software development generally for the purpose of receiving some useful data from server system 140. In this particular case, the useful data is actual vehicle parking duration, an actual amount of time a particular vehicle has occupied a destination location, for a particular vehicle license plate number. By definition, Pay-by-Plate systems already have the vehicle license plate number, as this is obtained as part of the end user payment process.

Integration via a Pay-by-Plate API provided by server system 140 may be according to one of two options. First is a data inflow model, in which the third party parking payment system pushes information into server system 140. Second is a data outflow model, in which server system 140 pushes all relevant information to the third-party Pay-by-Plate system.

In an embodiment, server system 140 may include an inflow-based Pay-by-Plate API for use by a third-party parking payment system via, for example, network 110, in which the third party parking payment system pushes information into server system 140 via the inflow-based Pay-by-Plate API. The inflow-based Pay-by-Plate API may be configured to perform steps including, for example: (1) waiting for the third party parking payment system to establish a connection; (2) authenticating the identity of the third party parking payment system; (3) receiving data from the third party parking payment system; (4) processing and storing data to database 141; (5) determining parking violation status; (6) marking use of a destination location as a parking violation in database 141 for further processing, for example, by the below-described parking violation pre-processing logic; (7) periodic confirmation that the inflow-based Pay-by-Plate API is active and valid, such as, but not limited to, by use of "keep-alive"/"ping" messages or commands; and (8) closing the connection when requested or upon timeout. In connection with step (1), this may involve listening on a TCP or UDP port for the third party parking payment system to establish the connection. In connection with step (2), the third party parking payment system is required to authenticate itself through the inflow-based Pay-by-Plate API before data exchange is permitted. If authentication fails, a retry mechanism may be provided, and after several unsuccessful attempts the connection may be dropped. In connection with step (3), server system 140 may be configured to, via the inflow-based Pay-by-Plate API, receive vehicle parking information from the third party parking payment system every time a vehicle/driver pays for parking. The received information for a particular vehicle may include, for example, vehicle license plate information (including plate number and state/province information), a paid parking start date/time, and paid parking end date/time. In connection with step (5), a Pay-by-Plate integration module included in server system 140 may be configured to compare a duration of paid parking indicated by the data received from step (3) with the actual parking duration determined by server system 140. If the actual parking duration exceeds the paid parking duration, processing of step (6) is performed, otherwise step (6) is not performed.

In an embodiment, server system 140 may include an outflow-based Pay-by-Plate API for use by a third-party parking payment system via, for example, network 110, in which server system 140 pushes all relevant information to the third-party Pay-by-Plate system. The outflow-based Pay-by-Plate API may be configured to perform steps including, for example: (1) waiting for the third party parking payment system to establish a connection; (2) authenticating the identity of the third party parking payment system; (3) uploading data to the third party parking payment system; (4) receiving an acknowledgement for the uploaded data; (5) responding to "keep-alive"/"ping" requests from the third party parking payment system; and (6) closing the connection when requested or upon timeout. In connection with step (1), this may involve listening on a TCP or UDP port for the third party parking payment system to establish the connection. In connection with step (2), the third party parking payment system is required to authenticate itself through the outflow-based Pay-by-Plate API before data exchange is permitted. If authentication fails, a retry mechanism may be provided, and after several unsuccessful attempts the connection may be dropped. In connection with step (3), server system 140 may be configured to, via the outflow-based Pay-by-Plate API, upload vehicle parking information to the third party parking payment system every time a vehicle vacates a destination location associated with the third party parking payment system. The uploaded information for a particular vehicle may include, for example, vehicle license plate information (including plate number and state/province information), an identifier for the destination location recognized by the third party parking payment system (which may require translation from an identifier used internally by server system 140), an actual date/time the particular vehicle began use of the destination location, and an actual date/time the particular vehicle vacated the destination location.

In another embodiment, server system 140 is configured to integrate with a Pay-by-Plate system in two steps. First, server system 140 obtains vehicle payment information from the Pay-by-Plate system (for example, paid parking start and end times, and vehicle license plate number) by using a Pay-by-Plate system-provided API. At this stage, server system 140 will have the precise information required to generate a list of vehicle license plates with parking violation details. However, instead of server system 140 presenting this list to the parking operator, there may be instances where an incumbent parking payment vendor wishes to retain control over how the parking violation information flows back to the parking operator. This can be accomplished by sending the vehicle violation data back to the Pay-by-Plate system by using the API provided by server system 140. The Pay-by-Plate system will then have total control over how the list of "offending" vehicles is presented to the parking operator (such as by way of a custom software application developed by the Pay-by-Plate system vendor).

A significant difference between this integration method and integration with the Pay-by-Plate system via the API provided by server system 140 is that this integration method requires minimal development effort on the part of the Pay-by-Plate system vendor. Since all the key information to be presented to the parking operator is already supplied by the API provided by server system 140 without any further analysis required, this information can simply be displayed or forwarded to the parking operator with minimal software development. This integration approach represents a "pull" followed by a "push" model.

There are two main reasons why use of a Live Operator team as part of the system illustrated in FIG. 1 warrants consideration and may offer a practical option to offer to prospective parking operators as a value added feature.

First, although server system 140 autonomously receives and processes images obtained from the identification and destination cameras, there are typically live operators who monitor obtained images and software executing on server system 140. These live operators can review operation of server system 140 and take appropriate actions on an exception basis if required. For example, when unexpected problems occur, Live Operators can review images related to the problems and deduce information that server system 140 may not be configured to handle.

An advantage with the networked architecture supported by server system 140 is that a single Live Operator team can oversee or augment operations at multiple sites regardless of their respective geographic locations or the fact that the facility operations may be owned by different parking operations or even competitors. As a result, the Live Operator option can be a scalable and cost-effective approach for parking operators. Furthermore, by using IP multicast or similar standard TCP/IP protocol, a video stream can effectively be sent simultaneously to multiple destinations, thereby allowing the Live Operator option to be added at a future date in addition to local on-site monitoring staffed by the parking operators.

Second, depending on the available technology, Pay-and-Display and curbside meter configurations discussed above may present significant real life challenges. Not only are cameras with a high level of zoom are required, there are also potential problems such as that an angle of view from a particular video camera may not be sufficient to properly detect an expiration flag of a traditional curbside parking meter, or a bar code on a Pay-and-Display ticket on a vehicle dashboard may be facing away from any of the video cameras due to the physical three dimensional shape of the dashboard and the placement of the ticket itself.

With the Live Operator option, server system 140 can generate exception events to the Live Operator when server system 140 fails to automatically detect a key piece of information such as license plate number, status of an expiration flag on a traditional parking meter, or bar code/printed information on a Pay-and-Display ticket. Such an exception event may trigger a Live Operator to take a number of specific actions, including but not limited to Rewind/Fast Forward/Pause/Freeze-Frame FWD & RWD specific footages captured by identification and/or destination cameras, zoom in/out on particular areas of interest in the captured footages, Pan/Tilt/Zoom video cameras in real-time in order to obtain enhanced images, and dispatch on-site personnel to perform inspection of a vehicle or parking meter, either visually of by use of mobile device 150 to obtain enhanced images for use by server system 140.

In an embodiment, server system 140 is configured to correlate a mailing address of a registered owner of a vehicle with its license plate number, allowing a parking operator to collect parking citation revenue. Red-light camera systems utilize such a mechanism to have citation tickets mailed to registered owners of the vehicles. In connection with such functionality, parking operators are in three different categories.

First, in the event that the parking operator is part of the city/municipality who may already have access to DMV records, server system 140 only needs to supply a list of Vehicle License Plate Numbers with state/province information along with parking violation details (such as date, time, and location) in order for citations to be mailed to registered owners.

Second, for private parking operators with no pre-established access to DMV records, there are a number of legislated ways to obtain personal information, including name and address, tied to a Vehicle License Plate Number. These methods vary from state to state (and provinces). As an example, in the State of New York, private parking operators are allowed to gain access to such information by use of Driver's Privacy Protection Act (DPPA) form MV-15DPPA "for use in connection with the operation of private toll transportation facilities", "including companies that operate parking facilities for the purpose of providing notice to the owners of vehicles who have used the facility." For some jurisdictions, name and address information may be released online, and server system 140 may be configured to obtain and process such information. In some jurisdictions, name and address information of a third-party vehicle owner may not be released online, but instead must be obtained either by mail or in person. In such jurisdictions, private parking operators may wish to obtain name and address information on a batched basis (such as daily, every 2 or 3 days, or weekly).

Third, for private parking operators who prefer real time access to registered owner information, a number of private Vehicle License Number Plate databases are available via the Internet. The main advantage of this approach is that name and address information can be immediately and automatically retrieved with no manual operation required.

As noted in connection with FIG. 1, end user systems 170 can include in-vehicle systems. In an embodiment, new vehicle dashboards straight from car manufacturers can include an indicator icon, similar to other dashboard lights such as "check engine," parking-brake warnings, or cruise-control indicator lights. This indicator icon is normally not illuminated when vehicle 130 is driving on the highway or not inside a perimeter serviced by server system 140. As vehicle 130 approaches parking lots or curbside parking areas, the indicator icon may light up in amber advising an end user of the availability of automated parking services provided by server system 140. When vehicle 130 pulls into a destination location, such as a parking space, the indicator icon turns red to notify the end user that parking has not been paid. Once parking has been paid (whether by the aforementioned Pay-by-Phone, curbside meter, Pay-by-Space, or other techniques), the indicator icon turns green to signify parking has been paid. In an embodiment, these visual indications may be accompanied by audio notifications, which may be simple chimes or voice announcements. Audio output may be performed by providing audio information or data to a vehicle entertainment unit.

As this invention enables many aspects of parking payment and enforcement processes to be automated, it is important to provide feedback to end users as to what the server system 140 is doing or a particular state server system 140 has associated with vehicle 130 (for example, whether vehicle 130 has committed a parking violation). End users can then react accordingly to the feedback provided. While operating within a highly automated payment and enforcement system, it is a reasonable expectation that end users or registered owners do not get penalized for minor or administrative errors. Feedback provided via a simple interface such as the dashboard indicator icon can greatly alleviate this concern.

For example, as vehicle 130 parks, if the indicator icon remains red after some time, the end user realizes an exception event has taken place. It may be that a credit card number on file has expired and therefore server system 140 is not able to apply a parking charge. This feedback provides the end user the opportunity to, for example, visit a website provided by or in connection with server system 140 to query his/her account status and correct the error.

There are a number of potential sources of information by which the dashboard indicator icon can get its information from, including built-in cellular data or WiFi vehicle connectivity, or smart sensors (discussed below). For older vehicles without factory-installed indicator icons, end users may be provided with a retrofit kit in the form of a visual module which receives information by way of Bluetooth, cellular data, or WiFi connectivity.

In an embodiment, the indicator icon feature receives GPS location data from third-party in-vehicle subsystems via a vehicle wiring harness. The GPS data allows the indicator icon feature to determine whether vehicle 130 is currently in a paid parking zone.

Similar to the vehicle dashboard icon, smart sensors can be designed into new vehicles straight from the factory. Using technology similar to the ZigBee IEEE 802.15.4 standard, low cost, low power, short range wireless mesh networks can be created among vehicles as well as between vehicles and parking equipment. Each vehicle becomes a node, and a node can communicate with a distant end-point by relaying data through intermediate nodes by forming a mesh network. Each smart sensor contains a unique identifier, such that license plate information is no longer critical. In an embodiment, smart sensors may be configured to communicate with server system 140 via a cellular data connection and/or provide Pay-by-Phone functionality, whereby payment for use of a destination location may be made via the smart sensor.

Many applications are possible with the introduction of such smart sensors. For example, the smart sensors can include a GPS receiver or communicate with an in-vehicle GPS to determine a present location of vehicle 130 and report the present location to server system 140. With some GPS techniques, such as assisted GPS, a location determined via GPS may have enough accuracy and precision to determine the vehicle is making use of a particular destination location. These sensors can also communicate with parking meters and in essence report the presence of the vehicle and how long it has been parked for. This parking information can be relayed to a distant device/network through the mesh network so the parking equipment does not need to be located within the vicinity of the vehicle. For vehicles equipped with smart sensors, use of the identification and destination cameras is not necessary, as the embedded smart sensor already provide a unique identity of the vehicle to server system 140.

In an embodiment, vehicles may be equipped with a near-field communication (NFC) device, such as an RFID chip. For example, such a communication device may be included in a mirror hanger. In another example, an RFID chip may be embedded in a ticket provided by a Pay-and-Display device. By obtaining a vehicle identification from a near-field communication device, use of images captured by identification cameras, such as images including license plate information, may not be required by server system 140 and/or may be used to verify information received from an NFC device corresponding to an observed vehicle.

In an embodiment, the smart sensors can sense the status of other vehicles nearby (such as, but not limited to, whether they are moving, parked, and for what duration they have been parked) and report the status to server system 140. The end result is that server system 140 is aware as to where almost any smart sensor-equipped vehicle is parked and for how long. By combining this information with parking payment information from either third-party systems or turnkey platforms, it is possible to determine the identity of vehicles that did not pay for parking or with expired parking, and have parking violation tickets mailed to the registered owners or even charging a parking fine on the spot (for example, by charging a credit card on file).

In an embodiment, a destination camera can be provided with laser status notification. Similar to laser logo devices seen at shopping malls and retail outlets, the laser status notification feature shines a nonharmful flashing red light enveloping a parked vehicle to notify an end user upon return that parking was not paid or has expired. This is akin to returning to a vehicle and seeing a parking ticket clipped under the windshield wiper under the traditional manual parking enforcement model. As a destination camera is typically located at elevation with respect to vehicles, an included laser status notification module has a bird's eye view to below destination locations to facilitate shining laser notification onto vehicles and destination locations.

In an embodiment, laser status notification feature replaces the need to mail out paper parking violation tickets. Once an end user receives a laser notification for a parking violation, the end user can then be expected to pay the parking fine through a number of media including, but not limited to, an online website or Pay-by-Phone. Furthermore, laser status notifications can be captured by the destination camera to provide later evidence of the parking violation and notification.

In an embodiment, dynamic real-time Individual Parking Space Reservation is a feature made possible by an online/phone/smart phone parking space reservation system, and may be further enhanced with the laser status notification feature. While currently some vendors offer parking space reservation feature, the feature is limited to space reservation in the general vicinity of parking spaces (for example, somewhere on a parking lot) as there is no practical method of physically reserving a single, particular parking space in an automated fashion. In addition, the reserved spaces are typically held open for a long period of time because there is also no practical way of knowing when a reserved parking spot becomes available again after the driver who reserved the space has parked and subsequently driven off.

In contrast, the dynamic real-time Individual Parking Space Reservation feature allows end users to pinpoint the exact parking space they desire (for example, a space closest to a shopping mall during Christmas shopping period), for a specified period of time (for example, a destination location may be reserved for use during some day in the future). Once a parking space has been reserved, a laser notification may be shined on the parking spot to indicate that the destination location is reserved (providing, for example, a red color as a warning to other drivers). The use of a destination location during a reserved period by another vehicle will result in a parking violation. This enables a parking operator to increase revenue by offering both tiered/premium parking spots, and advance reservation of parking spaces.

In an embodiment, a parking operator may designate particular destination locations as restricted only for use by vehicles for which a reservation has been made. In this embodiment, server system 140 may determine a number of available reserved destination locations for a given time, and price reservations according to how many unreserved destination locations remain available. In an embodiment, server system 140 may be configured to allow buyers to submit competing bids for the use of reserved destination locations.

In an embodiment, a Pay-by-Phone feature can be offered either directly on a turnkey platform or through a partnership with a third-party vendor. The end result is that end users can pay for parking by calling a particular IVR phone line, input a destination location number or vehicle license plate number, and a duration of parking. In another embodiment, Pay-Online is a variation along the same theme to support online payment for parking, typically via a website accessible via a web-enabled smartphone.

In an embodiment, a "push" technology feature can be incorporated where as soon as an end user parks vehicle 130, the end user receives a text message or other notification prompting for an affirmative reply to charge a specific parking rate until vehicle 130 leaves a destination location. Server system 140 identifies vehicle 130 via an identification camera, and further determines that vehicle 130 is associated with a pre-registered end user with credit card or other billing information and a cellular phone number or other contact information on record. Once server system 140 determines via a destination camera that vehicle 130 has parked in a destination location, server system 140 initiates a "push" sequence to actively notify and engage the driver for payment or confirmation of payment. By simplifying the payment process, improved parking revenue is realized.

In many traditional parking meter systems, if an end user pays for more time than actually used by the end user, excess time remains on the meter for use by a following end user. In an embodiment of the disclosed subject matter, as destination camera 125 allows server system 140 to accurately determine when a vehicle leaves a destination location, any "leftover" paid parking time can be reset to zero. One exception is traditional curbside meters, as these typically do not have any communication capability or the intelligence to activate the expiration flag prior to time expiration.

Server system 140 may be configured to provide a push technology software component that enhances the user experience when it comes to paying for parking. Push technology supports functions such as: (1) initiating a payment sequence via text message; (2) allowing a pre-registered user to take a photo of their license plate, then provide the photo to server system 140 by way of, for example, email or text-message; (3) allowing a non-registered user to take a photo of their license plate, then provide the photo to server system 140 by way of, for example, email or text-message; and (4) allowing drivers to sign up once to not get parking fees under a subscription-based model. The push technology component interacts with vehicle identifier detection logic, vehicle detection logic, database 141, and a payment gateway. In connection with item (1), based on a vehicle identifier of the vehicle that has just begun use of a destination location such as a parking space, the push technology component pushes a text message indicating that use of the destination location has begun, to a mobile phone number registered with server system 140. When the driver assents to the text message by replying with "yes", a credit card associated with the registered account may then get charged an appropriate usage fee, such as, but not limited to, a flat-rate parking fee for use of the destination location. In connection with item (2), a driver who has pre-registered with server system 140 may take photos of their license plate, then email or text-message the photo to server system 140. A credit card associated with a registered account for the pre-registered user then gets charged a usage fee. In connection with item (3), for vehicles bearing license plates not registered with server system 140, a driver may take a photo of the license plate, then email/text-message the photo to server system 140. Where a mobile phone service provider supports and provides access to such a billing feature, usage charges may be added to a user's monthly mobile device bill. In connection with item (4), a driver may sign up once to automatically pay for all usage fees (or at least all parking fees) with a registered credit card. The push technology software component may also be configured to automatically send a text message to a user In the event that server system 140 determines inappropriate use of a destination location, such as parking a vehicle in a "no parking" area.

Server system 140 may be configured to provide a parking violation pre-processing logic software component that examines all occurrences of destination location usages newly identified as violations and assigns them to a corresponding destination as specified in a system configuration, such as the license plate lookup module or the license plate forward module, discussed below. The parking violation pre-processing logic software component interacts with database 141, the system configuration utility, and third-party APIs. The parking violation pre-processing logic software component may be configured to: (1) enqueue violations identified by other software processes included in server system 140; (2) examine the next violation in the queue; (3) validate the destination location usage is a violation by verifying rules established via the system configuration utility in connection with the destination location and detected use of the destination location by a vehicle; (4) assign the violation to license plate processing logic; and (5) examine any other enqueued violations or await an identification of a later violation.

Server system 140 may be configured to determine whether a vehicle has an expired tag from an identification image. The identification image may be captured using a fixed Identification camera 120, although at typical distances and vehicle speeds, and the small size of the typical expiration date indicator on a license plate, determining whether a vehicle bears an expired tag from the identification image alone is generally not possible. With a PTZ-capable camera zoomed into a license plate of a stationary vehicle, either with an Identification camera or destination camera, it may be possible to zoom into a license plate to obtain enough detail to determine whether a vehicle bears an expired tag from the obtained image alone. In an embodiment, the identification image instead can be captured via a mobile or handheld camera, including, for example, a camera included in a smartphone or mobile device 150. An identification image obtained from such sources often has enough detail to determine whether a vehicle bears an expired tag from the identification image alone. In an embodiment, rather than use an image alone to determine if a tag is expired, server system 140 may be configured to query, via an API to a municipal database, determine whether a vehicle registration for a particular license plate number is expired. Server system 140 may be configured to, in the event it determines a vehicle is bearing an expired tag, report the vehicle to a municipality.

Server system 140 may be configured to provide a license plate processing logic software component that takes an identified destination location usage violation, such as a violation assigned by the parking violation pre-processing logic component, and converts it into an actionable item for either a Registered Owner (RO)/user of a vehicle involved in the destination location usage violation, or for a parking operator responsible for the destination location. For example, the actionable item can be in the form of a parking citation automatically mailed to the registered owner, or a license plate number displayed on a screen at a parking operations office. The license plate processing logic software component interacts with the parking violation pre-processing logic software component, system configuration utility, and database 141. The license plate processing logic component may be configured to check one or more business rules specified via the system configuration utility in connection with the destination location to determine the appropriate actionable item. For example, if a business rule specifies license plate lookup, a specific type of license plate lookup may also be specified, such as via an API provided by a municipality, or an API provided by a private business. Then license plate lookup is performed as specified. Also, business rules may identify sub-options such as mailing out parking tickets to a registered owner via API, or just providing a mailing address for a registered owner and any other associated information for the violation to the parking operator. In another example, if a business rule specifies license plate information forwarding, the license plate processing logic component checks to see the specific type of license plate information forwarding specified, and forwards the license plate information accordingly.

In order to utilize a license plate lookup API option for the purpose of identifying a mailing address for a registered owner from a license plate vehicle identifier, a license plate database, such as one provided by a private business, must exist and be available for searches for license plates belonging to a particular state/province for the license plate. Also, use of such a database must be reasonable in terms of any fees involved to such lookup is commercially viable. In the event that either condition above does not materialize, an alternative option may include providing the license plate in question to a municipal body, which typically has access to license plate records via the local police branch or otherwise.

The license plate processing logic software component may include a license plate lookup and followup submodule. The license plate lookup and followup submodule may be configured to make an API call to a license plate database to retrieve the mailing address for a registered owner of a vehicle. Examples of such databases include an HTTP-based Dial-in Search Account API provided by the New York State Department of Motor Vehicles, database services provided by the American Association of Motor Vehicle Administrators (AAMVA) or other insurance companies, and online collections of public records, such as PublicData.com (although many such collections are less reliable than government or commercially managed databases, thus possibly requiring additional efforts to ensure information is valid and accurate).

Also, the license plate lookup and followup submodule may be configured to automatically mail a parking citation to a registered owner associated with a vehicle that has misused a destination location. For example, the process of mailing may be automated via an API call to a printing/mailing service such as, but not limited to, L-Mail.com.

In an embodiment, the license plate lookup and followup submodule may be configured to create, maintain, and review records in database 141 to see if a given vehicle identifier (such as a license plate) is associated with prior misuse of a destination location within a specified period of time (which is configurable via, for example, the system configuration utility), If so, the license plate lookup and followup submodule may presume that the previously obtained address remains valid and accurate, skip the API call, and mail a citation using the previously obtained mailing address in the system in order to lower operating expenses associated with API calls. In the event that the parking citation has not been paid after a specified number of days (actual duration also configurable via, for example, the system configuration utility) or the citation is returned as undeliverable, a subsequent API call may be made to obtain a current address.

In an embodiment, a parking violation, such as, but not limited to, when paid parking expires or a vehicle is parked without payment, server system 140 may be configured to notify one or more enforcement officers with a location of a destination location, such as a longitude and latitude or an approximate street address. An enforcement officer then may go to the offending vehicle and issue a citation on the spot. In an embodiment, server system 140 may be configured to identify and/or locate an individual enforcement officer who is best suited to deal with a particular offending vehicle. Factors for making this identification may include, for example, the distance from the offending vehicle or workload of an enforcement officer, or whether an offending vehicle is to be towed (for example, where an offending vehicle must be promptly removed). In an embodiment, offending vehicles may have to be enqueued where, for example, there are too few enforcement officers or a particular enforcement officer has multiple offending vehicles to handle. In an embodiment, multiple enforcement officers may be notified of nearby offending vehicles, and individual enforcement officers may accept to handle particular offending vehicles. Server system 140 may also be configured to track enforcement officer performance, which may be used in connection with a reward or quota system for the enforcement officers. In an embodiment, an enforcement officer may be equipped with a mobile device 150, and mobile device 150 may be configured to preprint a citation for an offending vehicle to reduce an amount of time taken to deliver the citation to the vehicle.

Server system 140 may be configured to provide dynamic variable-rate parking fees. In an embodiment, server system 140 may record different parking rates for a destination location which vary according to time of day and/or day of the week, for example. In the event that a vehicle occupies a destination location over a period of time in which first and second rates apply, server system 140 may be configured to determine a total fee for use of the destination location based the first rate being applied from the beginning of the use of the destination location until the second rate applies, and the second rate being applied for the remaining time the vehicle occupies the destination location. In an embodiment, server system 140 may be configured to determine a number of vehicles which may be accommodated by the destination locations available in a given area, and base a fee or rate for parking on the determined number of vehicles. For example, as server system 140 determines this number decreases (for example, because there are fewer remaining destination locations), it may apply a higher rate for vehicles which begin to make use of the few remaining locations.

Server system 140 may be configured to allow a parking provider, via an API or the configuration utility, specify particular events for which a specified parking rate or flat fee is to be applied for specified destination locations. For example, if a concert occurs from 7-11 PM at a venue associated with or near a parking facility, the parking facility may levy a flat $10 fee for vehicles parked after 4 PM that same evening.

Server system 140 may be configured to provide a no-fine feature, where a driver may leave a vehicle parked in a destination location for as long as they wish, and have a credit card or other account billed for according to rules established for the destination location (such as, but not limited to, per-hour or flat rate per-day fees). In an embodiment, a text message or email may be pushed or otherwise sent to the driver indicating that the no-fine feature is available for the destination location, and allowing the driver to elect use of the no-fine feature, such as by replying with a message such as "yes" or "no fine". In an embodiment, server system 140 may be configured to generally make the no-fine feature available for all unrestricted destination locations in specified areas or throughout the destination locations tracked by server system 140. However, server system 140 may be configured not to offer the no-fine feature for a restricted destination location, such as, for example, a destination location subject to a 3-6 PM "no parking" rush hour restriction.

In an embodiment, server system 140 may be able to perform profiling based on 3D outline of the vehicle. For example, such profiling may be able to roughly profile a vehicle as belong to a category such as, but not limited to, sport utility vehicle (SUV), van, sedan, coupe, or motorcycle. In addition, a vehicle may be categorized as having a light or dark color. The vehicle profiling can serve non-parking applications, such as, but not limited to, assisting police tracking of stolen vehicles within a certain vicinity, Amber alert, Homeland Security needs. In an embodiment, the vehicle profiling can be used to provide additional vehicle characteristics for comparisons performed in tracking a vehicle from one tracking camera to another. In an embodiment, the vehicle profiling may provide an additional layer of confirmation of an identity of a vehicle for an automated parking citation mailing process. In an embodiment, manual 3D vehicle profiles are provided to server system 140. For example, one manual 3D vehicle profile for a Chevrolet Impala may describe a ratio of 1:2:1 for height of hood to height of passenger compartment to height of trunk.

In an embodiment, a laser transmitter, which may be integrated with an actuated beam-deflecting mirror, may be configured to shine a laser beam onto one or more destination locations. In an embodiment, the laser beam may shine on a retroreflector mounted on or around a destination location to provide a return signal to a receiver associated with the laser transceiver. When a vehicle occupies a destination location illuminated by the laser beam, the presence of the vehicle is detected by interruption of the laser beam or a return signal. In response to this detection, server system 140 may be configured to obtain a destination image and/or an identifier image with a nearby camera.

In an embodiment, server system 140 may be configured to, in addition to the aforementioned uses involving vehicle identification, also use an identification camera as a "red light camera" for the detection of events in which a vehicle incorrectly proceeds through an intersection controlled by a traffic light. For example, as a traffic light changes from amber to red, vehicles incorrectly proceeding through a late amber or red light may be identified, along with a captured vehicle license plate, such that server system 140 is configured to simultaneously utilize an imaging camera for both purposes. Alternatively or in addition, server system 140 may be configured to use an identification camera to detect "block the box" moving violations, where a vehicle remains within an intersection during a red light for the vehicle's direction of travel, which may lead to gridlock high-traffic situations.

In an embodiment, server system 140 may be configured to provide real-time vehicle tracking services for third parties such as, but not limited to, repossession companies (for locating vehicles with outstanding loan payments), law enforcement, homeland security. Server system 140 may provide an API by which such third-party entities may register vehicles of interest by, for example, a vehicle identifier such as a license plate. In the event that server system 140 determines the presence of a vehicle with the vehicle identifier, the registering party may be notified. Notifications may be provided in connection with an initial detection of the vehicle and/or when the vehicle is determined to have stopped. In an embodiment, records of the movements of a registered vehicle may be retained by server system 140, and made accessible, for example, via a map-based web interface, which may be configured to present updated information in real-time. The API may also allow a third party to designate an area of interest, for which server system 140 is configured to perform identification and tracking of any vehicles determined to have entered the area of interest. Server system 140 may also be configured to provide images of registered vehicles obtained by the tracking cameras. In an embodiment, any archived tracking information, such as the past use of destination locations, may also be made available to reconstruct a person's whereabouts over time (assuming the person is connected with the vehicle). In an embodiment, server system 140 may be configured to obtain vehicle images including an image of a driver's face, and may further be configured to perform facial recognition techniques to confirm facial characteristics of the driver correspond to a person of interest.

In an embodiment, server system 140 may be configured to determine and provide traffic count information, such as the number of vehicles determined to have traversed a given portion of roadway. Such information may be employed for purposes including, but not limited to, dynamic control of traffic systems such as traffic lights in response to currently observed traffic counts, and for determining construction requirements based on traffic counts observed over time. The traffic count information may include and/or be filtered on the basis of time and/or date, and/or determined vehicle characteristics, including, but not limited to, direction of travel and vehicle size or type (such as SUV, truck, car, or motorcycle). Additionally, server system 140 may determine vehicle counts in connection with a direction of entry and/or exit for a portion of roadway, such as, for example, how many vehicles were northbound or southbound upon exiting an eastbound portion of roadway, based on a direction each vehicle exits an intersection. In an embodiment, server system 140 may be configured for use in controlling access to and/or levy a toll upon vehicles by type, such as assessing a fee for the use of specified roadways by large trucks.

FIG. 5 is a block diagram that illustrates a computer system 500 upon which aspects of the invention may be implemented. Computer system 500 includes a bus 502 or other communication mechanism for communicating information, and a processor 504 coupled with bus 502 for processing information. Computer system 500 also includes a main memory 506, such as a random access memory (RAM) or other dynamic storage device, coupled to bus 502 for storing information and instructions to be executed by processor 504. Main memory 506 also may be used for storing temporary variables or other intermediate information during execution of instructions to be executed by processor 504. Computer system 500 further includes a read only memory (ROM) 508 or other static storage device coupled to bus 502 for storing static information and instructions for processor 504. A storage device 510, such as a magnetic disk or optical disk, is provided and coupled to bus 502 for storing information and instructions.

Computer system 500 may be coupled via bus 502 to a display 512, such as a cathode ray tube (CRT) or liquid crystal display (LCD), for displaying information to a computer user. An input device 514, including alphanumeric and other keys, is coupled to bus 502 for communicating information and command selections to processor 504. Another type of user input device is cursor control 516, such as a mouse, a trackball, or cursor direction keys for communicating direction information and command selections to processor 504 and for controlling cursor movement on display 512. This input device typically has two degrees of freedom in two axes, a first axis (e.g., x) and a second axis (e.g., y), that allows the device to specify positions in a plane. Another type of user input device is a touchscreen, which generally combines display 512 with hardware that registers touches upon display 512.

The invention is related to the use of one or more computer systems, such as computer system 500, collectively configured and/or programmed to perform implementing the techniques described herein. According to one embodiment of the invention, those techniques are performed by computer system 500 in response to processor 504 executing one or more sequences of one or more instructions contained in main memory 506. Such instructions may be read into main memory 506 from another machine-readable medium, such as storage device 510. Execution of the sequences of instructions contained in main memory 506 causes processor 504 to perform the process steps described herein. In alternative embodiments, hard-wired circuitry may be used in place of or in combination with software instructions to implement the invention. Thus, embodiments of the invention are not limited to any specific combination of hardware circuitry and software.

The term "machine-readable medium" as used herein refers to any medium that participates in providing data that causes a machine to operation in a specific fashion. In an embodiment implemented using computer system 500, various machine-readable media are involved, for example, in providing instructions to processor 504 for execution. Such a medium may take many forms, including but not limited to, non-volatile media, volatile media, and transmission media. Non-volatile media includes, for example, optical or magnetic disks, such as storage device 510. Volatile media includes dynamic memory, such as main memory 506. Transmission media includes coaxial cables, copper wire and fiber optics, including the wires that comprise bus 502. Transmission media can also take the form of acoustic or light waves, such as those generated during radio-wave and infra-red data communications. All such media must be tangible and/or nontransitory to enable the instructions carried by the media to be detected by a physical mechanism that reads the instructions into a machine.

Common forms of machine-readable media include, for example, a floppy disk, a flexible disk, hard disk, magnetic tape, or any other magnetic medium, a CD-ROM, any other optical medium, punchcards, papertape, any other physical medium with patterns of holes, a RAM, a PROM, and EPROM, a FLASH-EPROM, any other memory chip or cartridge, a carrier wave as described hereinafter, or any other medium from which a computer can read.

Various forms of machine-readable media may be involved in carrying one or more sequences of one or more instructions to processor 504 for execution. For example, the instructions may initially be carried on a magnetic disk of a remote computer. The remote computer can load the instructions into its dynamic memory and send the instructions over a telephone line using a modem. A modem local to computer system 500 can receive the data on the telephone line and use an infra-red transmitter to convert the data to an infra-red signal. An infra-red detector can receive the data carried in the infra-red signal and appropriate circuitry can place the data on bus 502. Bus 502 carries the data to main memory 506, from which processor 504 retrieves and executes the instructions. The instructions received by main memory 506 may optionally be stored on storage device 510 either before or after execution by processor 504.

Computer system 500 also includes a communication interface 518 coupled to bus 502. Communication interface 518 provides a two-way data communication coupling to a network link 520 that is connected to a local network 522. For example, communication interface 518 may be an integrated services digital network (ISDN) card or a modem to provide a data communication connection to a corresponding type of telephone line. As another example, communication interface 518 may be a local area network (LAN) card to provide a data communication connection to a compatible LAN. Wireless links may also be implemented. In any such implementation, communication interface 518 sends and receives electrical, electromagnetic or optical signals that carry digital data streams representing various types of information.

Network link 520 typically provides data communication through one or more networks to other data devices. For example, network link 520 may provide a connection through local network 522 to a host computer 524 or to data equipment operated by an Internet Service Provider (ISP) 526. ISP 526 in turn provides data communication services through the world wide packet data communication network now commonly referred to as the "Internet" 528. Local network 522 and Internet 528 both use electrical, electromagnetic or optical signals that carry digital data streams. The signals through the various networks and the signals on network link 520 and through communication interface 218, which carry the digital data to and from computer system 500, are exemplary forms of carrier waves transporting the information.

Computer system 500 can send messages and receive data, including program code, through the network(s), network link 520 and communication interface 518. In the Internet example, a server 530 might transmit a requested code for an application program through Internet 528, ISP 526, local network 522 and communication interface 518.

The received code may be executed by processor 204 as it is received, and/or stored in storage device 510, or other non-volatile storage for later execution. In this manner, computer system 500 may obtain application code in the form of a carrier wave.

In the foregoing specification, embodiments of the invention have been described with reference to numerous specific details that may vary from implementation to implementation. Thus, the sole and exclusive indicator of what is the invention, and is intended by the applicants to be the invention, is the set of claims that issue from this application, in the specific form in which such claims issue, including any subsequent correction. Any definitions expressly set forth herein for terms contained in such claims shall govern the meaning of such terms as used in the claims. Hence, no limitation, element, property, feature, advantage or attribute that is not expressly recited in a claim should limit the scope of such claim in any way. The specification and drawings are, accordingly, to be regarded in an illustrative rather than a restrictive sense.

What is claimed is:

1. A method of providing human review of an image stream for a parking camera system, the method comprising:

receiving a first image stream from a first camera having a first field of view, at least part of the first image stream showing a first vehicle or at least one destination location;

receiving a second image stream from a second camera having a second field of view, the second field of view being different from and at least partially overlapping with the first field of view, and at least part of the second image stream showing the first vehicle or the at least one destination location;

determining that an alphanumeric value for at least one type of information relating to the first vehicle or the at least one destination location is not automatically identified based on the at least part of the first image stream;

generating, in response to the determination that the alphanumeric value for the at least one type of information relating to the first vehicle or the at least one destination location has failed to be automatically identified, an exemption event;

enabling, in response to the generation of the exemption event, presentation of the at least part of the second image stream to a human operator;

receiving, from the human operator in response to enablement of the presentation of the at least part of the second image stream, a request to adjust the field of view of the second camera by changing a pan, tilt, or zoom of the second camera;

receiving, in response to reception of the request to adjust the field of view of the second camera, a third image stream from the second camera having a third field of view that is different from the second field of view, the third image stream being captured by the second camera temporally after the second image stream;

enabling, in response to the reception of the third image stream from the second camera, presentation of at least part of the third image stream to the human operator; and receiving, from the human operator in response to enablement of the presentation of the at least part of the third image stream, the alphanumeric value for the at least one type of information relating to the first vehicle or the at least one destination location, wherein the steps of receiving, determining, generating, and enabling are performed by one or more processors.

2. The method of claim 1, wherein:
the alphanumeric value for the at least one type of information relating to the first vehicle or the at least one destination location is a license plate identifier of the first vehicle; and
receiving the alphanumeric value for the at least one type of information relating to the first vehicle or the at least one destination location comprises receiving alphanumeric characters of the license plate identifier of the first vehicle.

3. The method of claim 1, wherein:
the third field of view includes a parking meter adjacent to the at least one destination location;
the alphanumeric value for the at least one type of information relating to the first vehicle or the at least one destination location is a status of an expiration flag of the parking meter adjacent to the at least one destination location; and
receiving the alphanumeric value for the at least one type of information relating to the first vehicle or the at least one destination location comprises receiving the status of the expiration flag of the parking meter adjacent to the at least one destination location.

4. The method of claim 1, wherein:
the third field of view includes a pay-and-display ticket visible within the first vehicle;
the alphanumeric value for the at least one type of information relating to the first vehicle or the at least one destination location is a bar code or printed information on the pay-and-display ticket visible within the first vehicle; and
receiving the alphanumeric value for the at least one type of information relating to the first vehicle or the at least one destination location comprises receiving an image of the bar code or alphanumeric characters of the printed information on the pay-and-display ticket visible within the first vehicle.

5. The method of claim 4, wherein the printed information on the pay-and-display ticket is a parking expiration time.

6. The method of claim 1, wherein:
the third field of view includes a handicap parking decal, a handicap parking mirror-hanger, a resident parking decal, or a vehicle registration decal visible within the first vehicle; and
the alphanumeric value for the at least one type of information relating to the first vehicle or the at least one destination location is information visible on the handicap parking decal, information visible on the handicap parking mirror-hanger, information visible on the resident parking decal, or information visible on the vehicle registration decal.

7. The method of claim 1, further comprising receiving, from the human operator in response to enablement of the presentation of the at least part of the second image stream, a request to rewind, fast forward, pause, or freeze-frame the at least part of the second image stream.

8. The method of claim 1, further comprising receiving, from the human operator in response to enablement of the presentation of the at least part of the second image stream, a request to zoom in or zoom out on an area of interest within the at least part of the second image stream.

9. The method of claim 1, further comprising receiving, from the human operator in response to enablement of the presentation of the at least part of the third image stream, a request for personnel to perform an inspection relating to the first vehicle or the at least one destination location.

10. The method of claim 9, further comprising:
identifying, in response to reception of the request for the personnel to perform the inspection relating to the first vehicle or the at least one destination location, the personnel to perform the inspection based on the location of the at least one destination location; and
notifying the personnel that the first vehicle is at the at least one destination location.

11. The method of claim 9, further comprising receiving, from a mobile phone carried by the personnel, one or more images of an area surrounding the first vehicle or the at least one destination location.

12. The method of claim 1, wherein enabling presentation of the at least part of the third image stream to the human operator comprises simultaneously forwarding the at least part of the third image stream to multiple different locations.

13. The method of claim 1, wherein enabling presentation of the at least part of the third image stream to the human operator comprises forwarding the at least part of the third image stream using an Internet Protocol communications protocol.

14. The method of claim 1, wherein enabling presentation of the at least part of the third image stream to the human operator comprises displaying the at least part of the third image stream to the human operator.

15. The method of claim 1, further comprising enabling presentation of a unique identifier of the at least one destination location.

16. The method of claim 1, further comprising:
    determining, based on the first image stream, one or more static characteristics of the first vehicle that do not change over time.

17. The method of claim 16, wherein the one or more static characteristics are one or more of a vehicle make, a vehicle model, a vehicle year, a vehicle color, a vehicle outline, a vehicle size, and a vehicle dimension.

18. The method of claim 1, further comprising:
    determining, based on at least one frame of the first image stream, that the first vehicle is stopped within the at least one destination location at a first time;
    determining, based on at least another frame of the first image stream, that the first vehicle has left the at least one destination location at a second time that is after the first time;
    indicating that the first vehicle began use of the destination location at the first time; and
    indicating that the first vehicle completed use of the destination location at the second time.

19. The method of claim 1, further comprising indicating, in response to the reception of the alphanumeric value for the at least one type of information relating to the first vehicle or the at least one destination location, a first unique identifier of the first vehicle, an identifier of the at least one destination location, and a type of parking violation by the first vehicle within the at least one destination location.

20. The method of claim 1, wherein the first vehicle is stopped within the at least one destination location, the method further comprising determining, in response to the reception of the alphanumeric value for the at least one type of information relating to the first vehicle or the at least one destination location, a cost for the first vehicle to occupy the at least one destination location or a fine for violation of one or more rules associated with the at least one destination location.

21. The method of claim 20, wherein the cost for the first vehicle to occupy the at least one destination location is determined, the method further comprising:
    identifying a mailing address associated with an owner of the first vehicle; and
    automatically generating, in response to identification of the mailing address associated with the owner of the first vehicle, a citation requesting payment of the cost for the first vehicle to occupy the at least one destination location or the fine for violation of one or more rules associated with the at least one destination location.

22. The method of claim 21, wherein identifying the mailing address associated with the owner of the first vehicle comprises automatically determining a license plate identifier of the first vehicle based on the at least part of the first image stream without human interaction.

23. The method of claim 21, wherein identifying the mailing address associated with the owner of the first vehicle comprises receiving a license plate identifier of the first vehicle from the human operator.

24. The method of claim 20, further comprising charging, in response to the determination of the cost for the first vehicle to occupy the at least one destination location or the fine for violation of one or more rules associated with the at least one destination location, the cost or the fine to an account associated with the first vehicle.

25. The method of claim 24, wherein charging the cost or the fine to the account associated with the first vehicle comprises charging the cost or the fine to a stored credit card in the account associated with the first vehicle.

26. A system for providing human review of an image stream for a parking camera system, the system comprising one or more processors connected to at least one storage device, and the system being configured to:
    receive a first image stream from a first camera having a first field of view, at least part of the first image stream showing a first vehicle or at least one destination location;
    receive a second image stream from a second camera having a second field of view, the second field of view being different from and at least partially overlapping with the first field of view, and at least part of the second image stream showing the first vehicle or the at least one destination location;
    determine that an alphanumeric value for at least one type of information relating to the first vehicle or the at least one destination location is not automatically identified based on the at least part of the first image stream;
    generate, in response to the determination that the alphanumeric value for the at least one type of information relating to the first vehicle or the at least one destination location has failed to be automatically identified, an exemption event;
    enable, in response to the generation of the exemption event, presentation of the at least part of the second image stream to a human operator;
    receive, from the human operator in response to enablement of the presentation of the at least part of the second image stream, a request to adjust the field of view of the second camera by changing a pan, tilt, or zoom of the second camera;
    receive, in response to reception of the request to adjust the field of view of the second camera, a third image stream from the second camera having a third field of view that is different from the second field of view, the third image stream being captured by the second camera temporally after the second image stream;
    enable, in response to the reception of the third image stream from the second camera, presentation of at least part of the third image stream to the human operator; and
    receive, from the human operator in response to enablement of the presentation of the at least part of the third image stream, the alphanumeric value for the at least one type of information relating to the first vehicle or the at least one destination location.

27. A storage device storing a computer program for providing human review of an image stream for a parking camera system, the computer program comprising one or more code segments that, when executed, cause one or more processors to:
    receive a first image stream from a first camera having a first field of view, at least part of the first image stream showing a first vehicle or at least one destination location;
    receive a second image stream from a second camera having a second field of view, the second field of view being different from and at least partially overlapping with the first field of view, and at least part of the second image stream showing the first vehicle or the at least one destination location;

determine that an alphanumeric value for at least one type of information relating to the first vehicle or the at least one destination location is not automatically identified based on the at least part of the first image stream;

generate, in response to the determination that the alphanumeric value for the at least one type of information relating to the first vehicle or the at least one destination location has failed to be automatically identified, an exemption event;

enable, in response to the generation of the exemption event, presentation of the at least part of the second image stream to a human operator;

receive, from the human operator in response to enablement of the presentation of the at least part of the second image stream, a request to adjust the field of view of the second camera by changing a pan, tilt, or zoom of the second camera;

receive, in response to reception of the request to adjust the field of view of the second camera, a third image stream from the second camera having a third field of view that is different from the second field of view, the third image stream being captured by the second camera temporally after the second image stream;

enable, in response to the reception of the third image stream from the second camera, presentation of at least part of the third image stream to the human operator; and receive, from the human operator in response to enablement of the presentation of the at least part of the third image stream, the alphanumeric value for the at least one type of information relating to the first vehicle or the at least one destination location.

\* \* \* \* \*